M. W. MAINE.
NEEDLE STRAIGHTENING MACHINE.
APPLICATION FILED JULY 30, 1917.

1,361,528.

Patented Dec. 7, 1920.
20 SHEETS—SHEET 2.

M. W. MAINE.
NEEDLE STRAIGHTENING MACHINE.
APPLICATION FILED JULY 30, 1917.

1,361,528.

Patented Dec. 7, 1920.
20 SHEETS—SHEET 4.

M. W. MAINE.
NEEDLE STRAIGHTENING MACHINE.
APPLICATION FILED JULY 30, 1917.

1,361,528.

Patented Dec. 7, 1920.
20 SHEETS—SHEET 5.

M. W. MAINE.
NEEDLE STRAIGHTENING MACHINE.
APPLICATION FILED JULY 30, 1917.

1,361,528.

Patented Dec. 7, 1920.
20 SHEETS—SHEET 8.

M. W. MAINE.
NEEDLE STRAIGHTENING MACHINE.
APPLICATION FILED JULY 30, 1917.

1,361,528. Patented Dec. 7, 1920.
20 SHEETS—SHEET 9.

Inventor
M. Warren Maine
By Sturtevant & Mason
Attorneys

Witnesses:

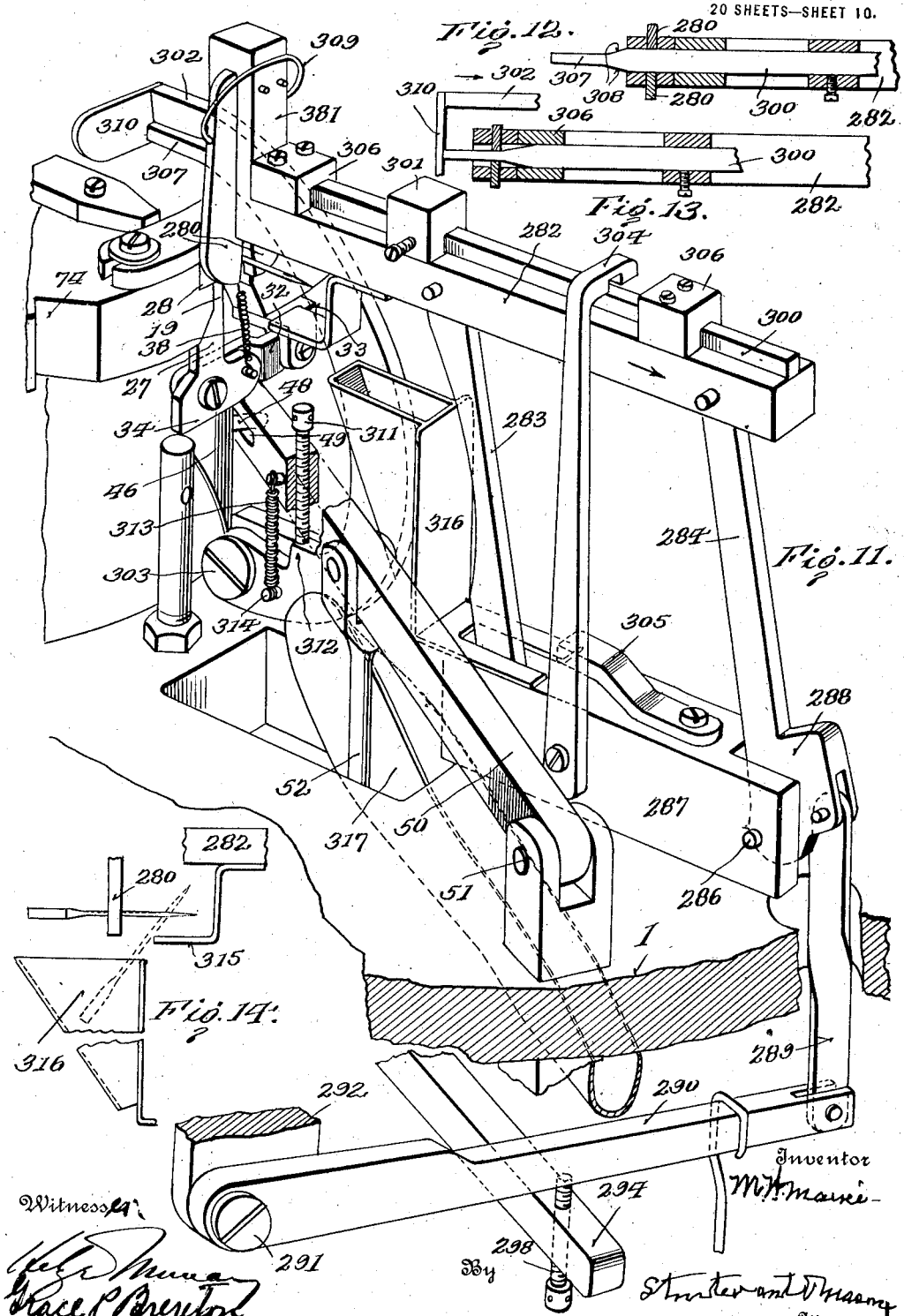

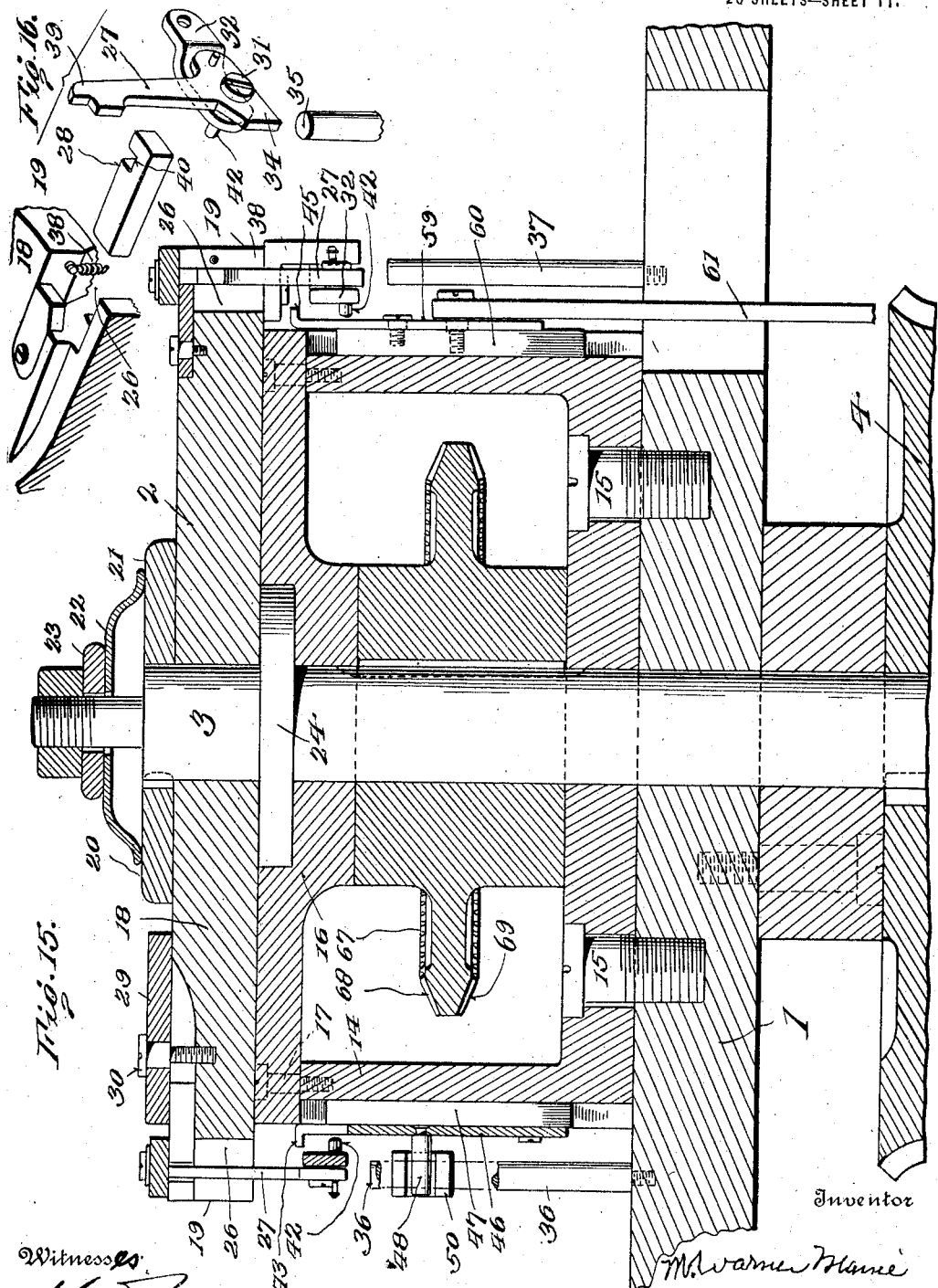

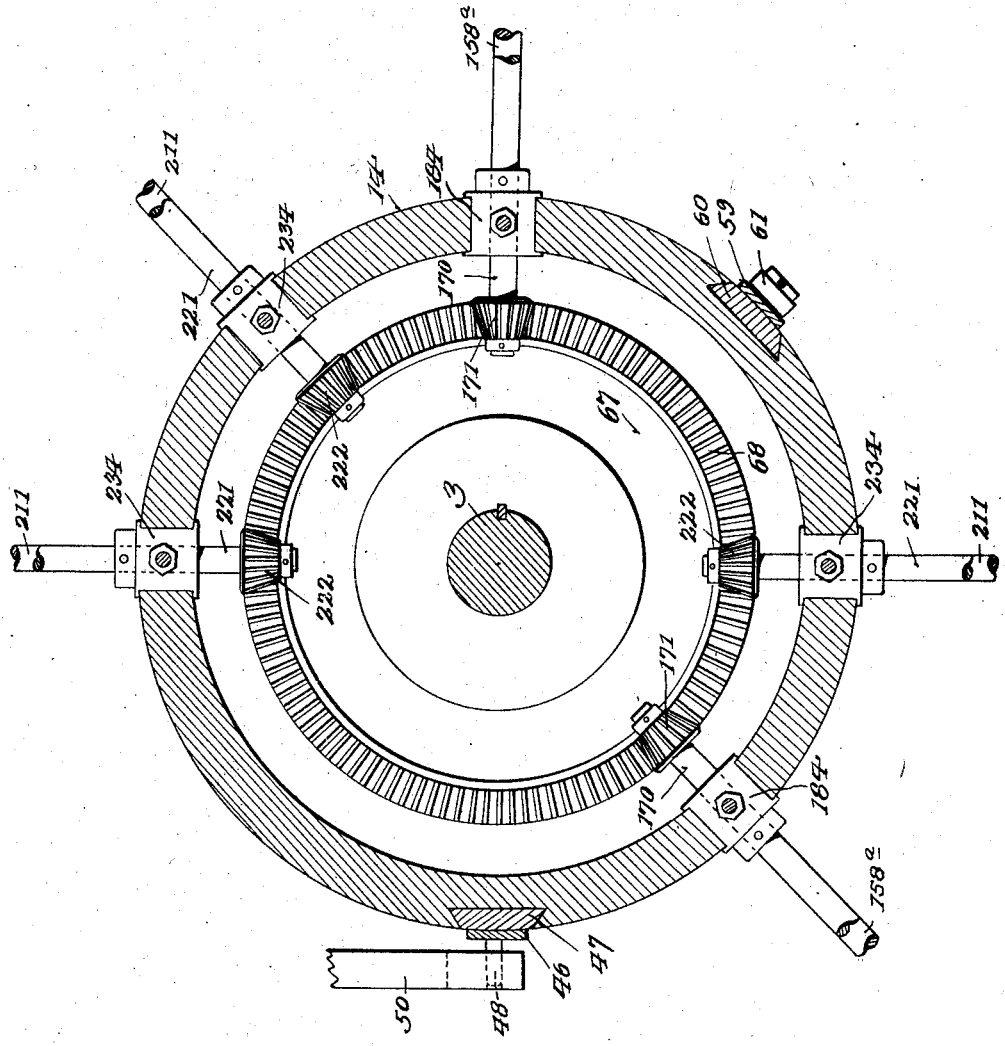

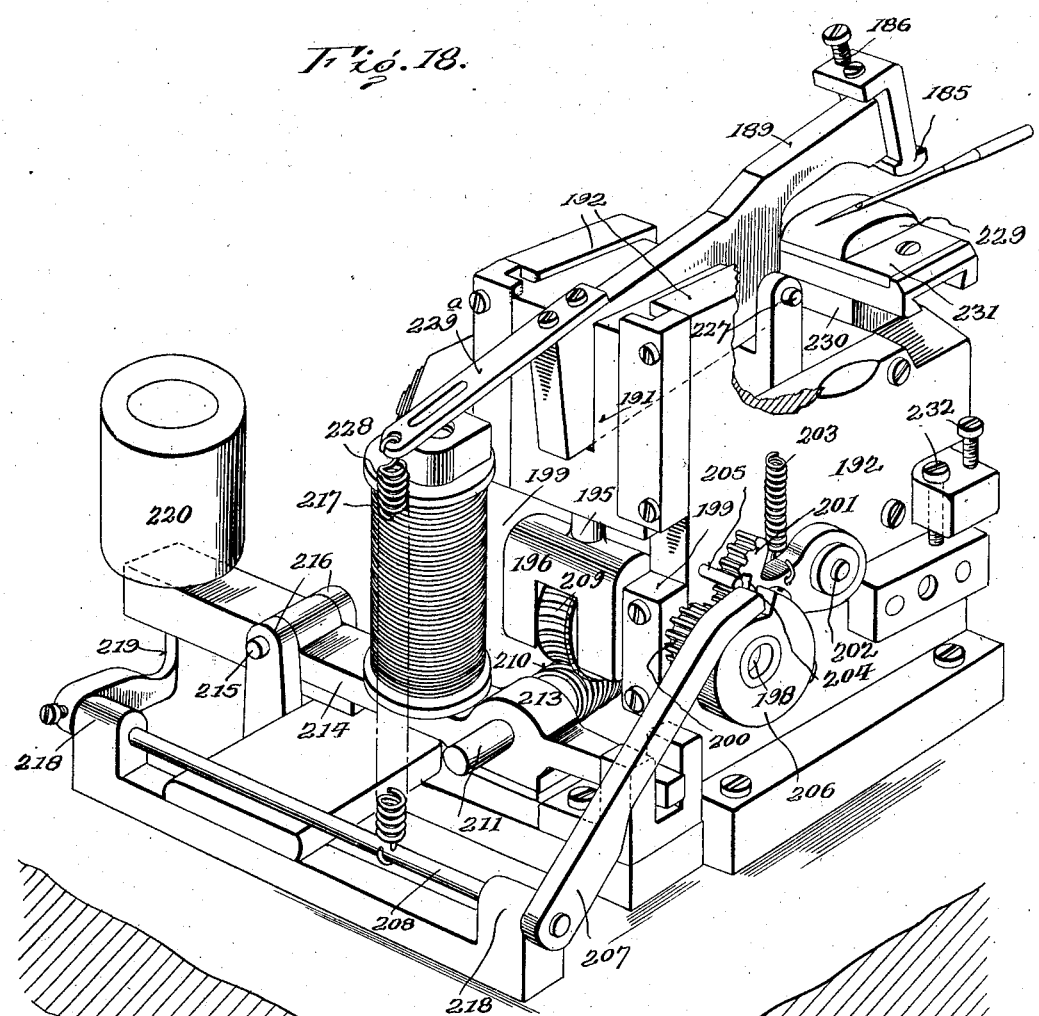

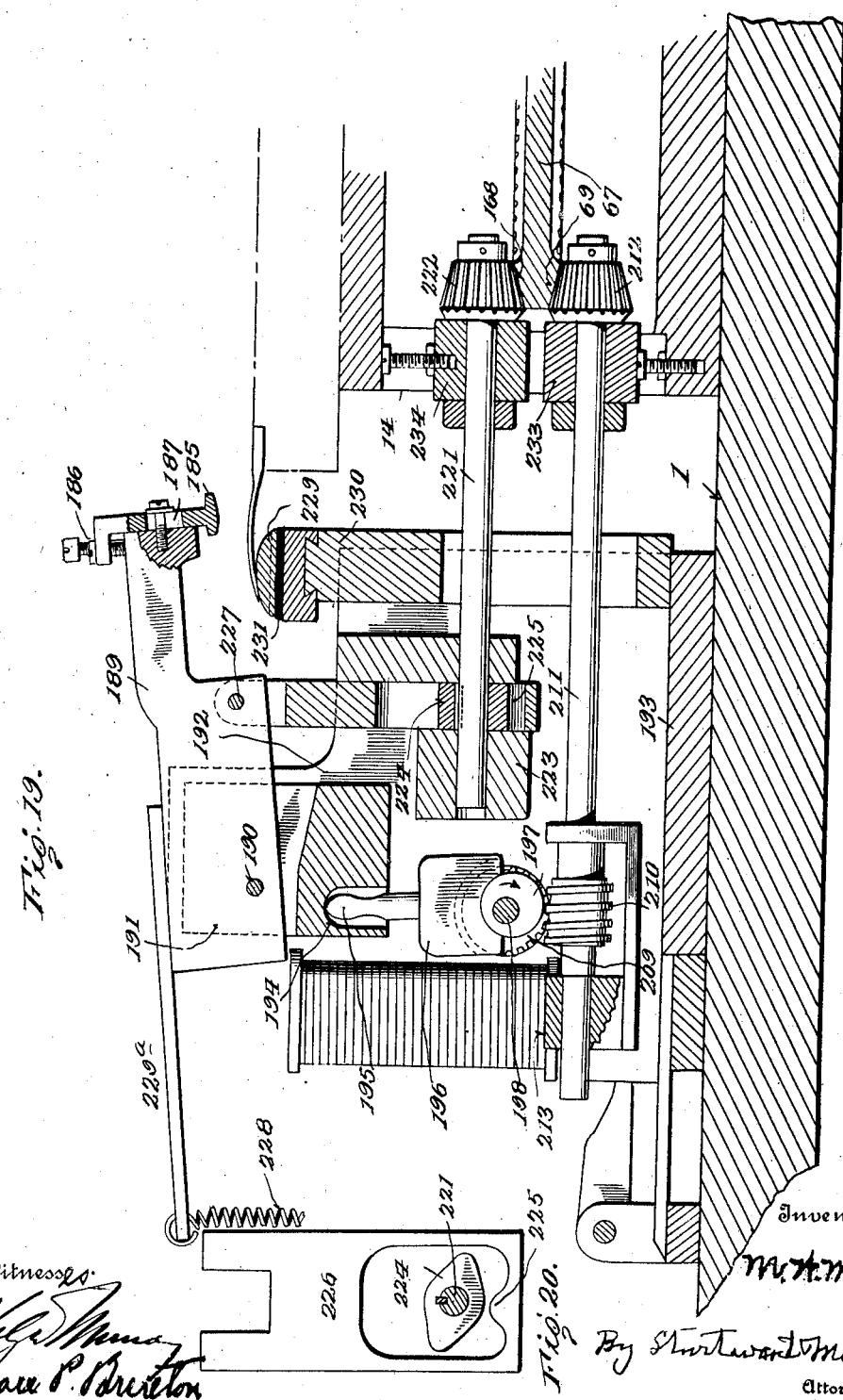

M. W. MAINE.
NEEDLE STRAIGHTENING MACHINE.
APPLICATION FILED JULY 30, 1917.

1,361,528.

Patented Dec. 7, 1920.
20 SHEETS—SHEET 15.

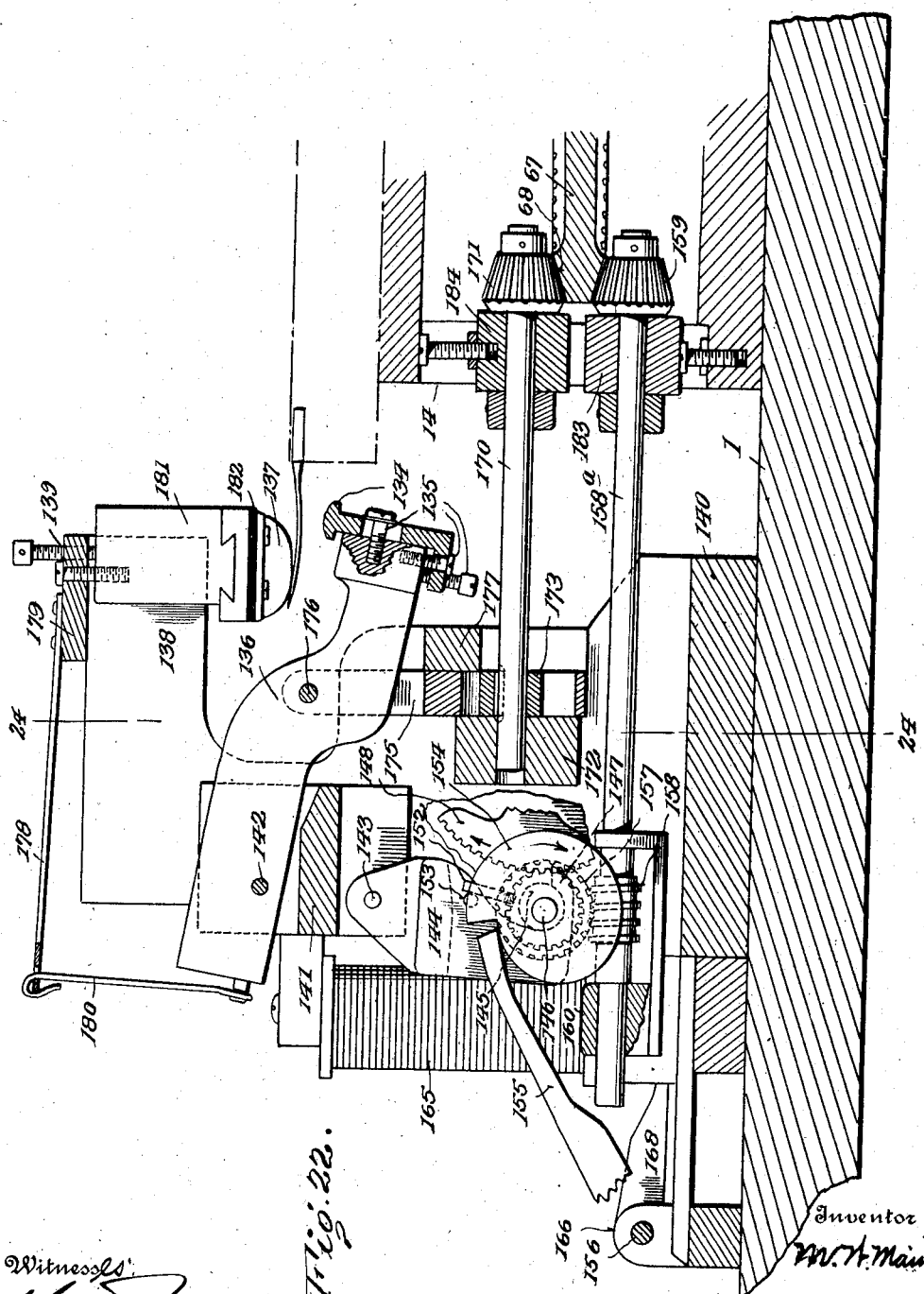

M. W. MAINE.
NEEDLE STRAIGHTENING MACHINE.
APPLICATION FILED JULY 30, 1917.
1,361,528.
Patented Dec. 7, 1920.
20 SHEETS—SHEET 17.
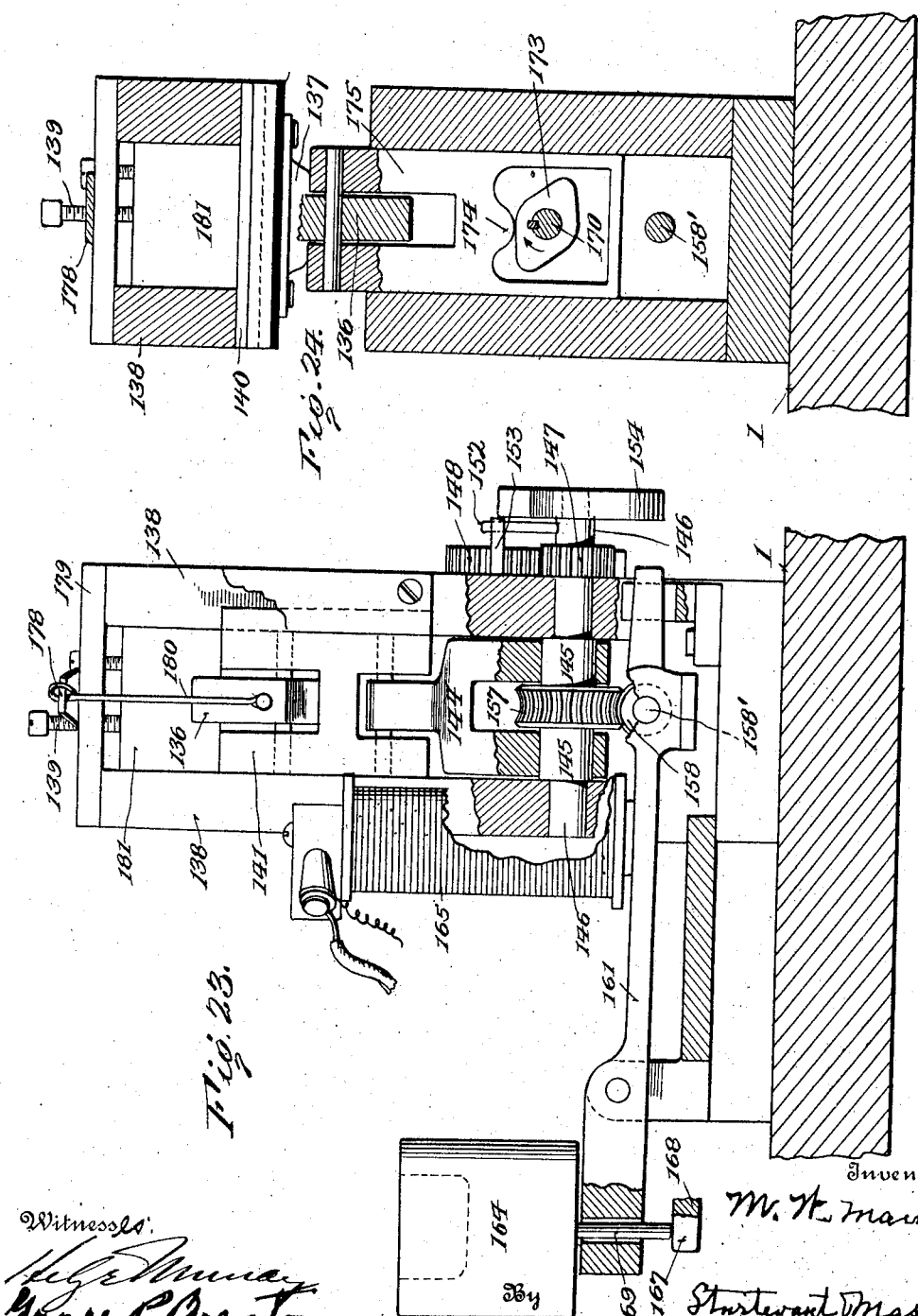

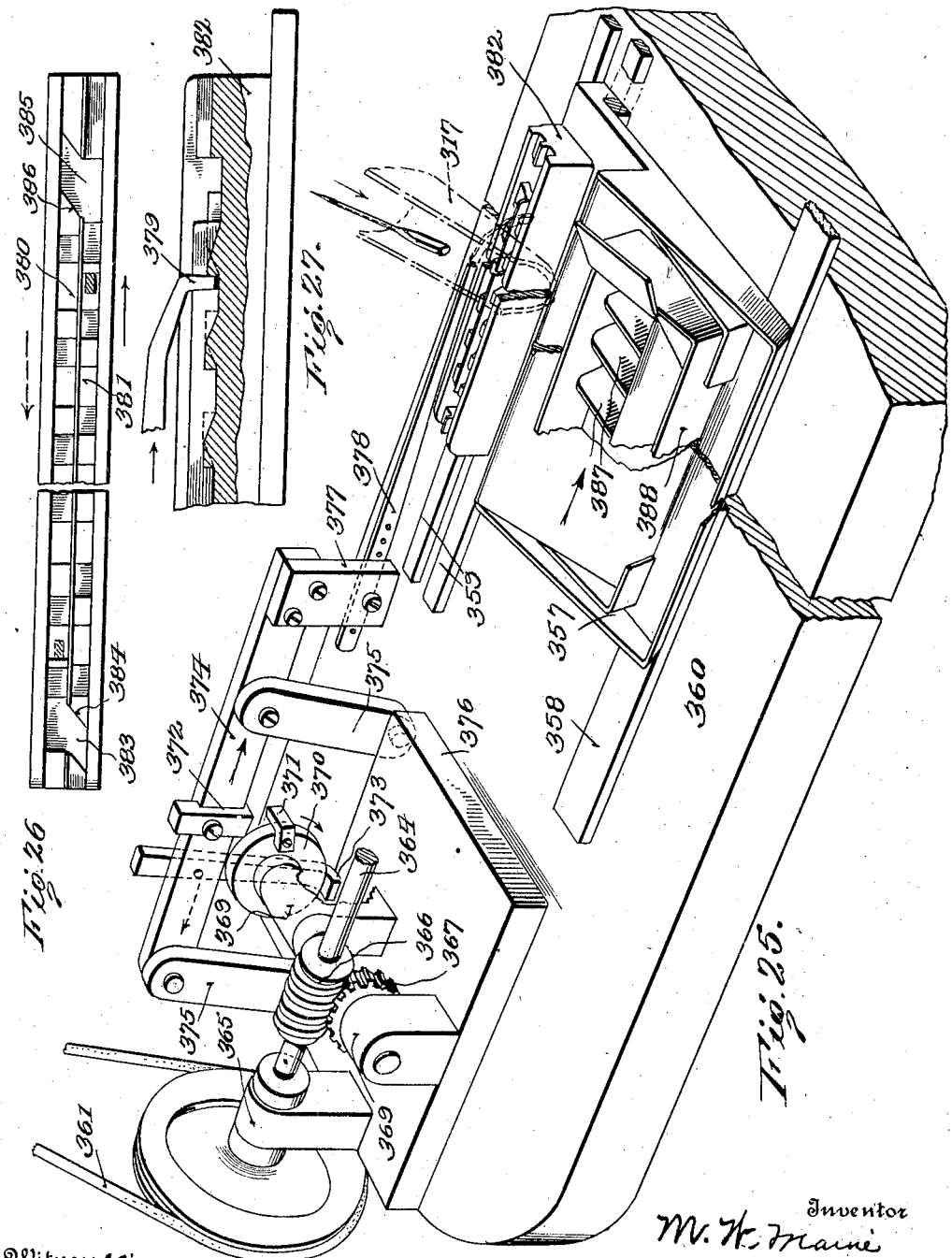

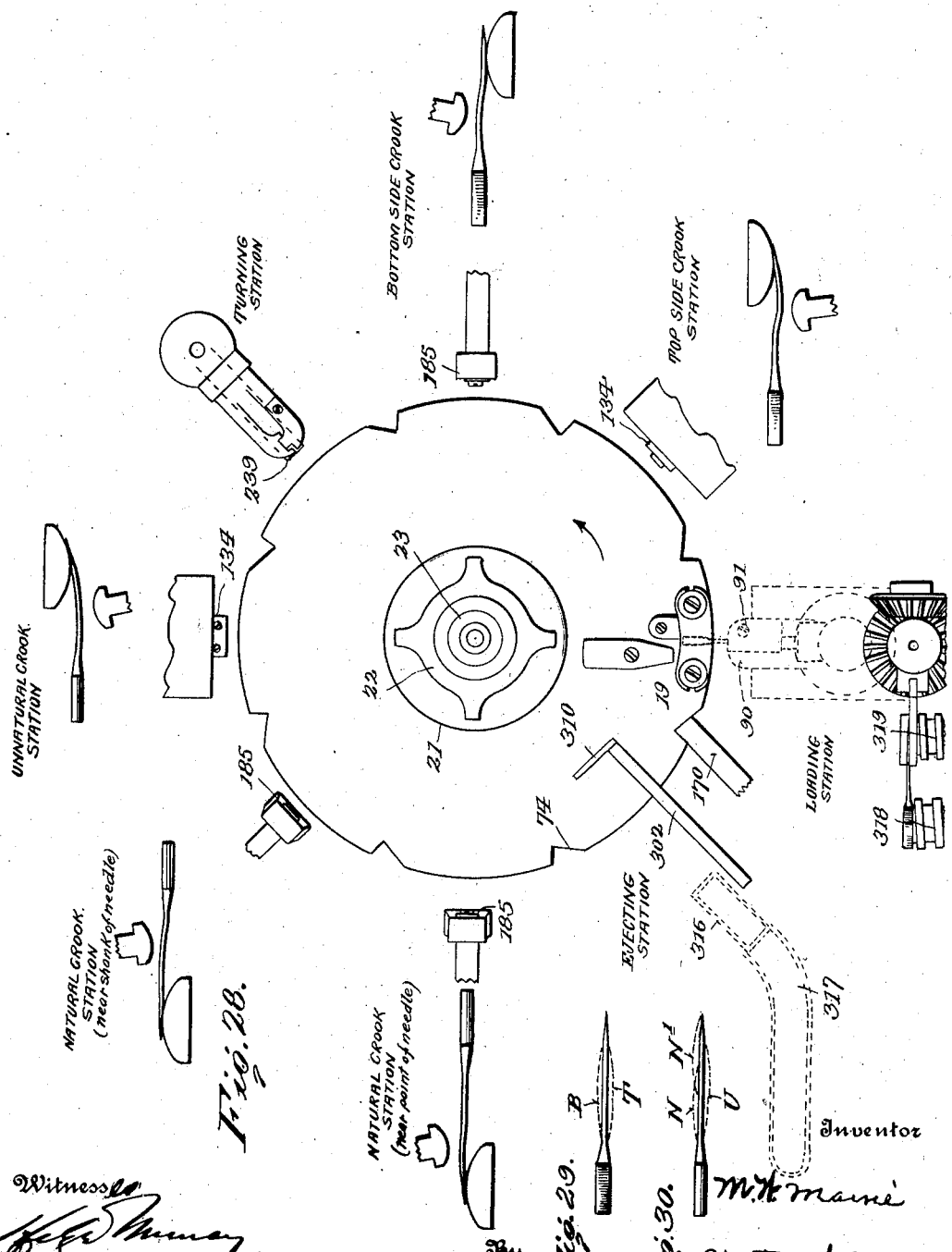

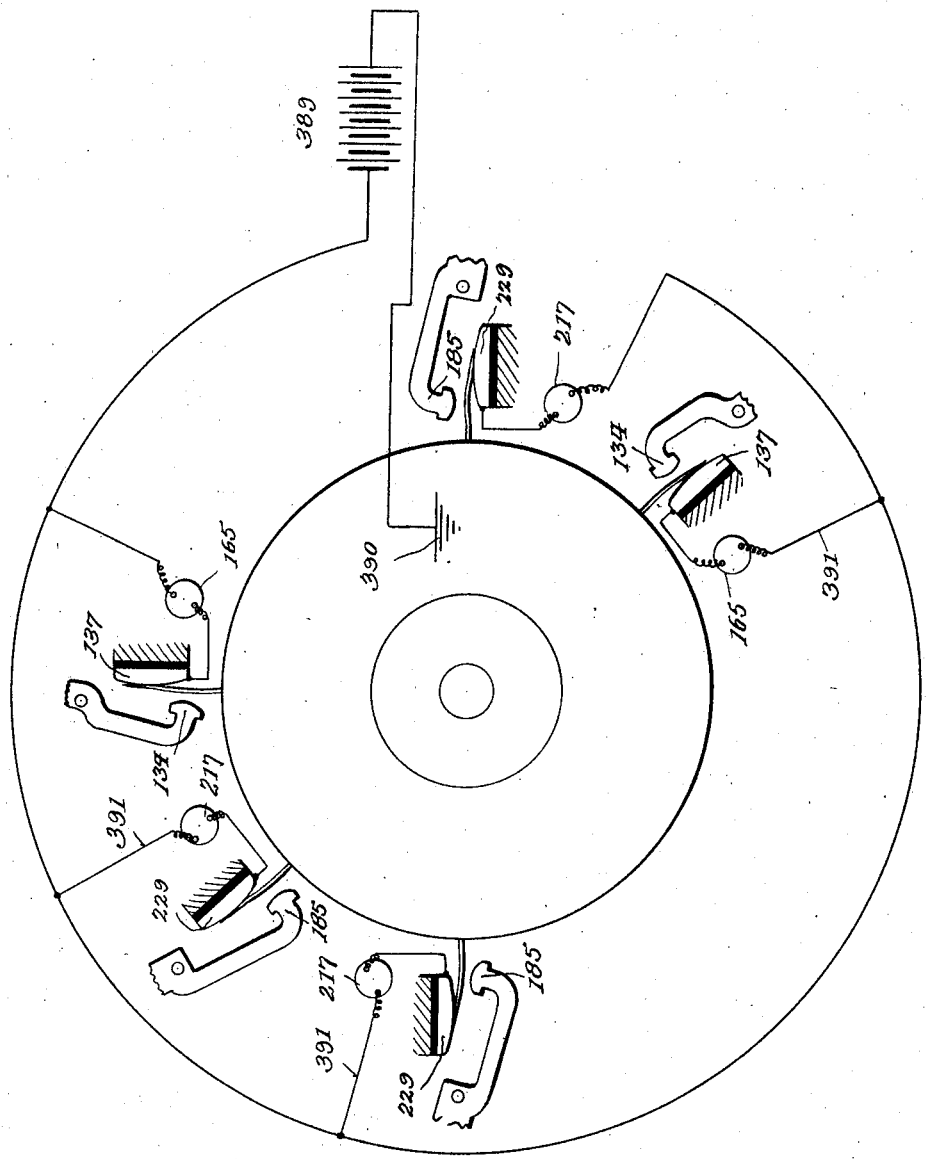

UNITED STATES PATENT OFFICE.

MONROE WARNER MAINE, OF TORRINGTON, CONNECTICUT, ASSIGNOR, BY MESNE ASSIGNMENTS, TO THE TORRINGTON COMPANY, OF TORRINGTON, CONNECTICUT, A CORPORATION OF CONNECTICUT.

NEEDLE-STRAIGHTENING MACHINE.

1,361,528.   Specification of Letters Patent.   Patented Dec. 7, 1920.

Application filed July 30, 1917. Serial No. 183,586.

*To all whom it may concern:*

Be it known that I, MONROE WARNER MAINE, a citizen of the United States, residing at Torrington, in the county of Litchfield, State of Connecticut, have invented certain new and useful Improvements in Needle-Straightening Machines, of which the following is a description, reference being had to the accompanying drawing and to the figures of reference marked thereon.

This invention relates to certain new and useful improvements in automatic mechanism for straightening needles, and contemplates more especially the production of a machine for removing the curves or crooks in what is known in the trade as flat shank needles.

The curves or crooks in the needle result from the tempering process to which the needle is subjected, and for the purposes of this invention will be referred to as the top side, bottom side, natural and unnatural crooks. It may be that subsequent to the tempering process a needle will contain but one of the above mentioned crooks and then again, as is more frequently the case, it will contain two or more of any of the aforesaid crooks.

The herein described invention has been designed to successfully remove any and all crooks in a flat shank needle dispensing with the laborious hand operation thus saving expense in production without deterioration of the finished product.

An object of the present invention is the production of a needle straightening machine including in combination means for successively operating upon the needle which is gripped in an intermittently rotated support, a needle feeding mechanism for delivering in succession needles to the machine, and means for ejecting the straightened needles.

Another object of this invention is the production of a needle straightening machine including in combination an intermittently rotated needle support, means for successively feeding needles to said support, and a plurality of needle straightening devices located about said support for successively operating upon the needles.

Another object of this invention is the production of a needle straightening machine including in combination an intermittently rotated needle support, needle feeding and turning mechanisms, and means including a plurality of needle straightening devices for removing in succession the top side, bottom side, unnatural and natural crooks.

A further object of this invention is to produce an automatic needle straightening machine in which the operations of the needle straightening devices are maintained until the crook in the needle is removed, the relative effective strength of the blow given by the straightening hammer varying during each straightening operation.

A further object of the invention is the production of an automatic needle straightening machine in which the needles are positively hammered straight by successively arranged blow delivering devices and relatively located anvils, the effective operation of the blow delivering devices being dependent upon an electrical circuit which passes through the needle being straightened and the anvil as long as the crook which is being hammered out remains in the needle and any portion of said needle contacts with the relatively positioned anvil.

A still further object of the invention is the production of a needle straightening machine including in combination an intermittently rotated support, means for successively loading said support with needles to be straightened, a plurality of electrically controlled straightening devices radially located about said support, means for maintaining the operation of any one or more of the straightening devices until the crooks in each needle are removed, means for positively turning the needle in the course of the straightening operation, an ejecting mechanism for delivering the straightened needle to a needle receiving pan, and means for automatically distributing the straightened needles in said receiving pan.

With these and other objects in view the invention further consists in the combination, arrangement, and adjustment of the several mechanisms hereinafter described and pointed out in the appended claims.

In the accompanying drawings which show by way of illustration an embodiment of the invention—

Fig. 11 is an enlarged perspective view of the needle ejecting mechanism and chuck holding and releasing devices.

Fig. 12 is a detail sectional view through the ejecting bar and gripping jaws, showing the position of the said gripping jaws when spaced apart radially to grip the needle.

Fig. 13 is a similar view showing the gripping jaws brought together after the needle has been gripped and is in the course of being ejected.

Fig. 14 is a detail view illustrating the manner in which the needle is delivered to the hopper leading to the needle receiving pan.

Fig. 15 is an enlarged sectional view through the needle support showing the chuck holding and releasing mechanisms.

Fig. 16 is a detached perspective view of the chuck jaws which grip the needle and hold it in place during the straightening operations while the said support is being rotated.

Fig. 17 is a horizontal sectional view through the needle support showing the means for transmitting motion to the several needle straightening stations.

Fig. 18 is a detail perspective view of one of the needle straightening stations designed to deliver a blow upon the top side of the needle and thereby remove the bottom side crook.

Fig. 19 is a sectional view through the station shown in Fig. 18 and a portion of the needle support.

Fig. 20 is a detail view of the hammer slide and cam control for delivering the blow to the needle.

Fig. 22 is a sectional side view of the straightening station shown in Fig. 21 and a portion of the needle support.

Fig. 23 is an end elevation of the top side chuck station shown in Figs. 21 and 22 with parts thereof in section.

Fig. 24 is a sectional view on the line 24—24 of Fig. 22 showing the hammer controlling slide and cam for operating the same.

Fig. 25 is a perspective view of the needle receiving pan for the straightened needles and the coöperating mechanism for evenly distributing the needles therein.

Fig. 26 is a detail plan view of the reciprocating slide for moving the needle pan.

Fig. 27 is a detail partial sectional view through the slide shown in Fig. 26.

Fig. 28 is a diagrammatic plan of the needle support and radially positioned operating stations, showing in diagrammatic side elevation at each station the relative operation of the straightening devices upon the needles.

Fig. 29 is a plan view of a flat shank needle showing the flat side up, illustrating in dotted lines the top and bottom side crooks.

Figure 1:
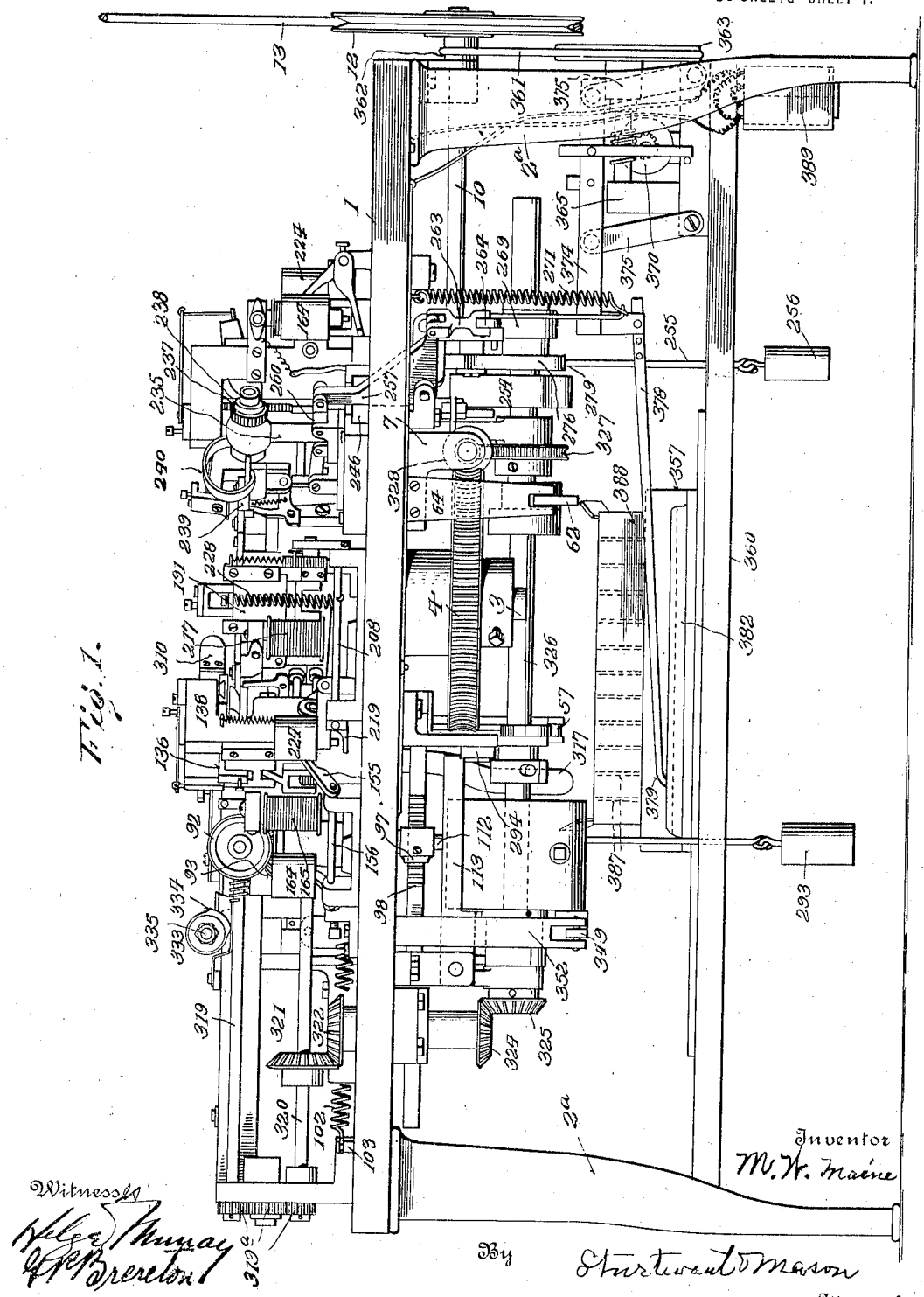
Figure 1 is a side elevation of my improved flat shank needle straightening machine.

Fig. 30 is a side elevation of the needle shown in Fig. 29 illustrating the unnatural crook in dotted lines on the under side of the blade of the needle and the natural crooks near the shank and the point thereof in dotted lines on the upper side of the blade of the needle, and Fig. 31 is a diagrammatic electrical illustration of the several stations and electrical circuits for controlling the operation of the straightening devices as long as the crooks remain in the needle.

The present invention has been primarily designed for use in straightening flat shank sewing machine needles, as distinguished from round shank needles, and comprises among other things an intermittently rotated needle support having a series of chucks therein to receive and grip the needles during the straightening operation; a plurality of needle straightening devices radially grouped about said needle support and designed to operate successively upon the needle for hammering out its top side crook, bottom side crook, unnatural crook, natural crook about midway the blade of the needle, and the natural crook from the center of the blade of the needle to its point; a loading head for taking the needle from the feeding and spacing mechanism and inserting it into one of the chucks of the rotated needle support with the flat side of the shank perpendicular; a needle turning station located between the straightening station which hammers out the bottom side crook and the station which hammers out the unnatural crook, whereby the flat side of the shank of the needle which has been initially inserted perpendicularly is now turned with the flat side of the shank up; needle ejecting mechanism for withdrawing the straightened needle from the needle support and delivering it to the hopper which leads to the needle receiving pan; needle feeding mechanism for delivering and spacing the needles to be gripped by the loading head hereinbefore referred to; a straightened needle distributing mechanism for proportioning an even number of needles between the partitions in the needle receiving pan; and an electric circuit for controlling the effective blow delivering operations of the straightening stations.

The needle support is rotated intermittently in a counter-clockwise direction and is locked against rotation intermittently during the operation of the straightening devices. There are five straightening stations shown, each of which is in circuit with an electro-magnet and an electric conductor leading to one pole of a battery. The opposite pole of said battery is grounded by a suitable conductor upon the machine. The circuit is closed in each straightening device when the blade of the needle is in contact with the anvil of the straightening device. During the time that the circuit is closed, the hammer delivers an effective and gradually increasing blow to the needle for removing the crook. As soon as the needle has been straightened sufficiently for the blade thereof to break the anvil contact, the circuit in the straightening device is broken, and the effective blow of the hammer is no longer delivered to the needle.

The straightening stations for removing the top side crook and the unnatural crook are similar in construction, and the description of the one hereinafter given is believed to be sufficient. The straightening stations for removing the bottom side crook, natural crook, near the shank, and the natural crook near the point of the blade, are of similar construction and the illustration together with the description of the bottom side crook station hereinafter given, is believed to suffice.

Referring to the diagrammatic illustration shown in Fig. 28, the several stations for straightening the needles are indicated in plan view, and the relative action of the straightening hammer upon the blade of the needle shown in associated side elevation. The needles are fed to the intermittently rotated support, and are moved in the direction of the arrow step by step to each successive station.

After passing the first two stations the needle is turned a quarter revolution for the subsequent action of the straightening hammers, thereby insuring a uniformly straightened needle blade.

Referring to the drawings, in which corresponding reference characters designate similar parts, my improved machine consists of a bed 1 suitably supported at a convenient height upon legs 2$^a$. The straightening devices and associated loading, turning and ejecting devices, together with the needle support, are mounted upon the upper side of the bed 1, and the mechanisms and controlling devices for effecting the movement of the aforesaid devices are located beneath the bed 1, as shown in Fig. 1 of the drawings.

The needle support 2 is mounted upon the bed, centrally of the surrounding straightening stations, and is rotated by means of a shaft 3, extending upwardly through the bed of the machine. The shaft 3 is driven by a worm-gear 4, which meshes with a worm 5 keyed to a cross shaft 6, suitably mounted in bearings 7 depending from the bed of the machine. The cross shaft 6 has keyed thereto a beveled gear 8, which is designed to mesh with a similar gear 9 keyed to a longitudinally extending shaft 10 mounted in bearings 11, depending from the bed of the machine. Keyed to the outer end of the shaft 10 is a pulley 12, over which passes a belt 13 for driving the machine from any suitable source of power (not shown).

*Needle support.*

Referring to Figs. 2, 4, 11, 15, 16 and 17, the needle support comprises a stationary hub section 14, secured to the bed of the machine by screws 15, a cap or bearing plate 16, secured to the upper edge of the hub section 14 by screws 17, a rotatable head support 18 revoluble upon the cap or bearing plate 16, and having a series of chucks or needle retaining devices 19, arranged upon the periphery thereof, and means for rotating the needle head support 18, said means including a frictional clamping device 20 which comprises a plate 21, keyed to the shaft 3, and a spring plate 22 clamped thereon by means of a nut and washer 23.

The needle head support 18 is frictionally clamped between the plate 21 and a collar 24 formed integral with the shaft 3. By this construction it will be seen that as the shaft 3 is rotated, the needle head support 18 will be moved, until intercepted by a locking device 25 to be hereinafter described. The needle support, and more especially the head 18 are provided with equally spaced chucks 19 which will now be described. Each chuck is located in a cut out portion 26, formed in the head 18, and comprises a pivoted jaw 27 designed to coöperate with a recessed stationary jaw 28 secured in the head 18 by means of a plate 29 secured to the head 18 by a screw 30. The jaw 27 is pivoted at 31 to a bracket 32 secured to another bracket 33 depending from the needle head support 18. The jaw 27 is provided with an offset portion 34 for coöperation with a series of stationary stops 35, 36 and 37 located at the loading, turning and ejecting stations of the machine respectively. A spring 38 is connected with the jaw 27 and the needle head support 18 for normally gripping the shank of the needle between the gripping surface 39 thereof and the stationary jaw 28. The recess 40 and stationary jaw 28 permit the movable gripping surface 39 to force the shank of the gripped needle firmly against the side of the stationary jaw 28.

This action is accomplished by means of the spring shown in Fig. 16, which extends down to and hooks over the pin shown at the right of the shoulder screw 31. Such spring exerts an up and left-hand over pressure through the double action levers 27 and 32. The opening motion is accomplished by the projection 43, in Fig. 15, pulling down on the extension of the shoulder screw 31, in Fig. 16, forcing the extension of the lever 27 down on to the post 35, see Fig. 16.

Projecting from the pivoted bracket 32 is a pin 42 designed to coöperate with angular projections 43, 44 and 45 respectively located at the loading, turning and ejecting stations. The angular projections 43 and 45 are arranged on a plate 46 secured to a slide 47 movable in the stationary hub section 14 of the needle support. A pin 48 projects from the plate 46 between bifurcations 49 at the end of a lever 50. The lever 50 is pivoted at 51 to a suitable support projecting upon the bed of the machine and is provided with a link 52 the opposite end of which is connected to a lever 53 pivoted at 54 to a depending bracket 55 extending beneath the bed of the machine. The lever 53 is pivoted at its lower end to the roller 56 designed to coöperate with cam 57 for controlling the movement of the slide 46 which in turn causes the angular projections 43 and 45 to coöperate simultaneously with the projecting pins 42 of the pivoted brackets 32 to which the movable jaws 27 of the chuck are pivoted.

By this construction it will be seen that the downward movement of the slide 46 will simultaneously open the chuck or needle retaining devices 19 at the loading and ejecting stations of the machine. The opening of the chucks or retaining devices 19 is caused by the downward movement of the angular projections 43 and 45 striking the pins 42 of the chuck members, thereby swinging the brackets 32 downwardly until the offset portions 34 of the gripping jaws 27 strike the stationary stops 36 and 38, thereby causing the gripping jaws 27 to swing away from the fixed jaws 28 for the insertion of the needle which is to be straightened, at the loading station, and for the release of a straightened needle at the ejecting station. A spring 58 secured to the lever 53 and the bottom of the bed 1 serves to keep the roller 56 against the cam 57 for effectively opening the chuck jaws as has been described.

Figure 6:
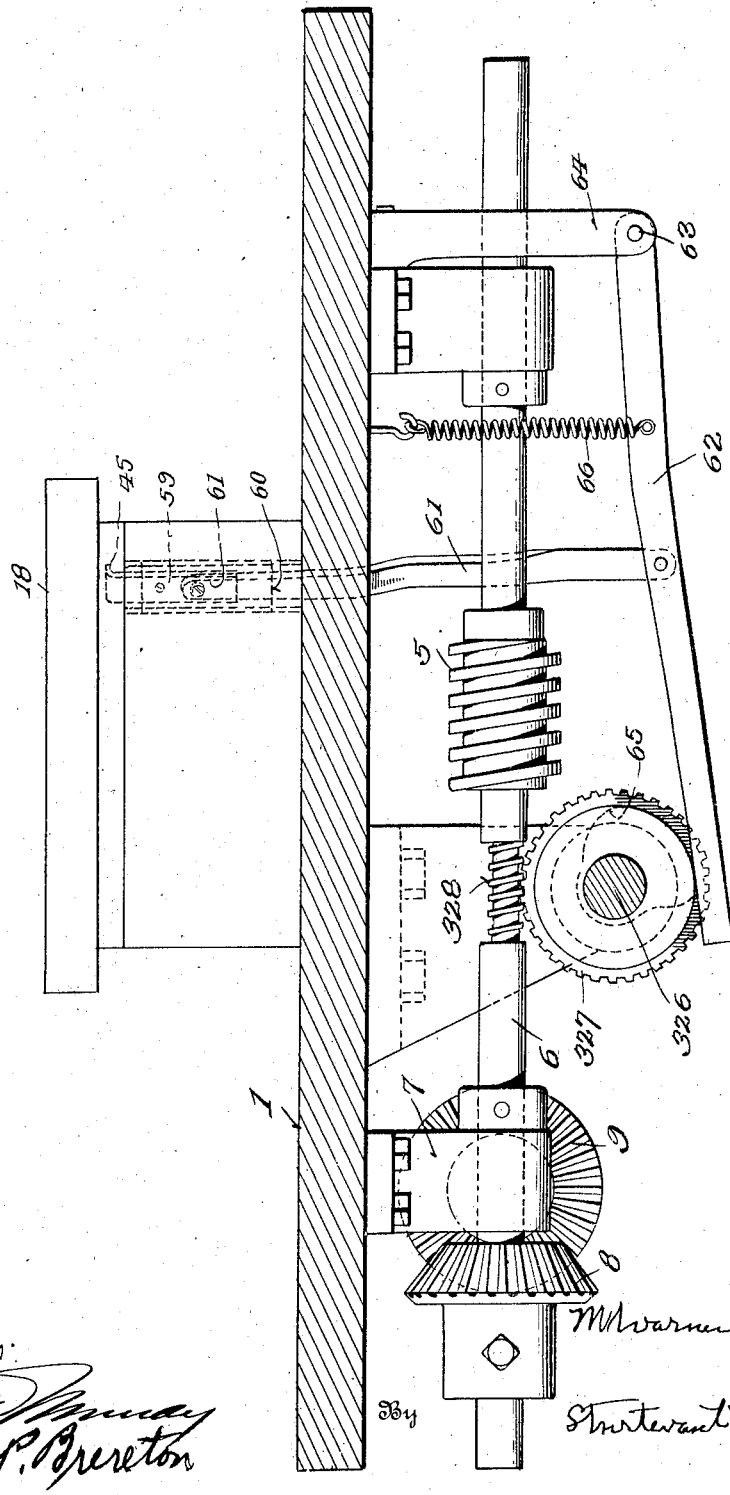
Fig. 6 is a transverse sectional view on the line 6—6 of Fig. 3 illustrating the driving mechanism of the machine and the cam control for releasing the needle from one of the chucks at the station which turns the needle in the course of the straightening operation.

The needle support is also provided with a similar chuck releasing device located at the turning station of the machine. Referring to Figs. 6 and 15, the angular projection 45 which coöperates with the pins 42 projecting from the brackets 32 of the gripping jaw, is carried by a plate 59 secured to a slide 60 vertically movable in a suitable guide in the hub section 14 of the needle support. Connected to the plate 59 and slide 60 is a depending arm 61, the opposite end of which is secured to the lever 62 pivoted at 63 to a depending bracket 64. The lever 62 is coöperatively associated with a cam 65 which controls the movement of the slide 60. A spring 66 secured to the lever 62 on the under side of the bed 1 serves to keep the said lever in contact with the cam 65.

By this construction it will be seen that as the slide 60 is lowered, the angular projection 45 strikes one of the pins 42 causing the bracket 32 to swing downwardly, and as the offset portion 35 of the gripping jaw 27 strikes the stationary stop 37, the chuck or needle retaining device is opened. When the chuck is opened the needle can be withdrawn by gripping jaws provided on the turning device to be presently described, and when shifted a quarter turn with the flat side of the shank of the needle up, is again seated within the chuck; whereupon when the needle support is again rotated the offset portion 34 of the gripping jaw 27 rides off the stationary stop 37, and the spring 38 causes the jaw 27 to again grip the shank of the needle against the stationary jaw 28 of the chuck. The movements of the chuck releasing devices carried by the needle support are timed to act substantially simultaneously when the needle support has been brought to an intermittent non-rotatable position.

Mounted within the stationary hub section 14 of the needle support is a master driving gear 67 keyed to the shaft 3 between the base of the hub section 14 and the cap bearing 16. The master gear 67 is provided with upper and lower beveled toothed sections 68 and 69 respectively. These annular beveled sections are designed to drive the mechanisms of the needle straightening stations, to be present described. The master gear 67 is continuously rotated about a shaft 3. The intermittent stopping of the needle support and more especially the needle head support or plate 18 carrying the chucks or needle retaining devices is controlled by a locking lever now to be described. The purpose of the locking lever is to intermittently interrupt the frictional driving contact between the integral collar 24 and the shaft 3 and the spring pressed plate 21.

Figure 2:
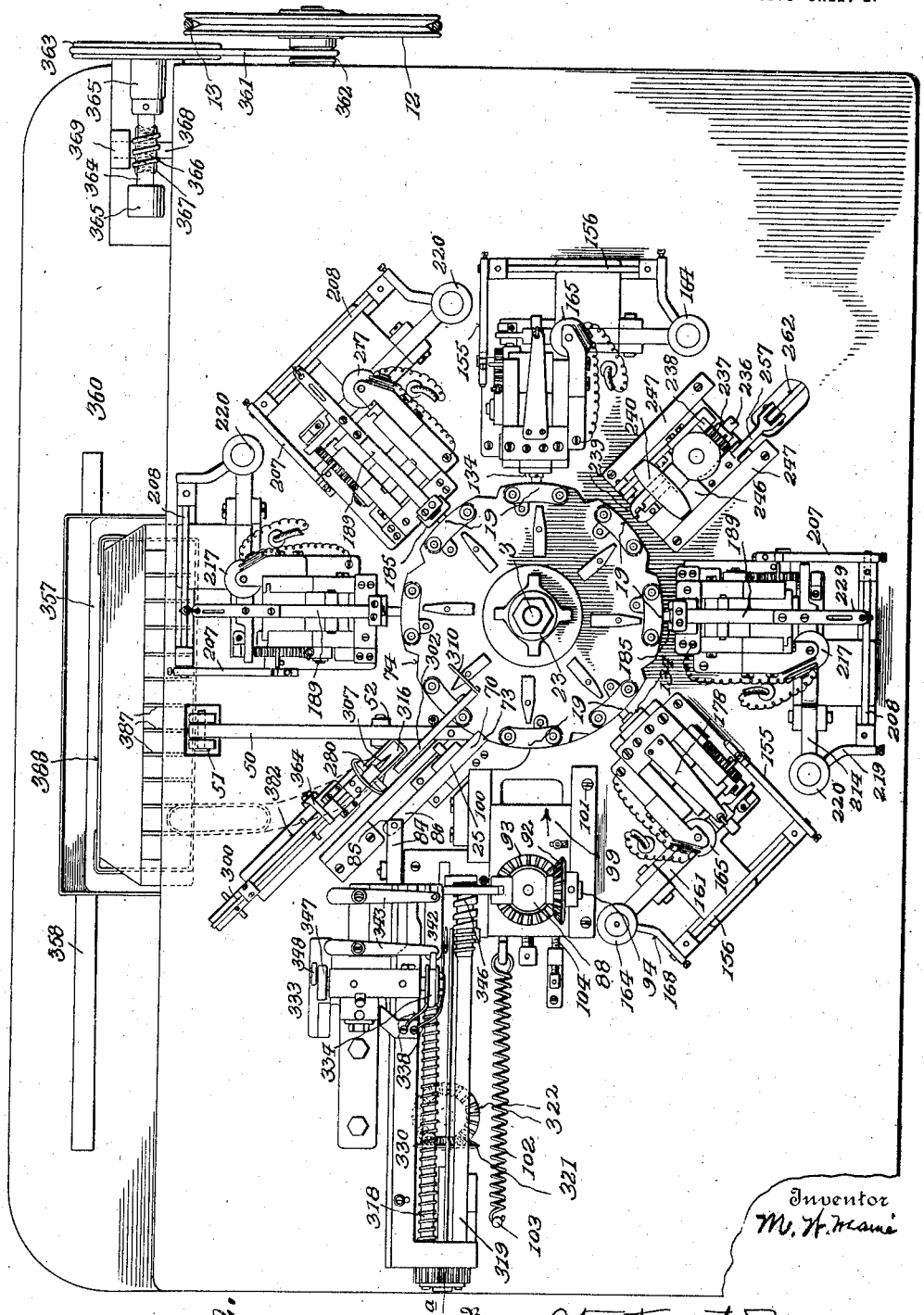
Fig. 2 is a top plan view thereof illustrating the successive stations at which the needle is operated upon.
Figure 4:
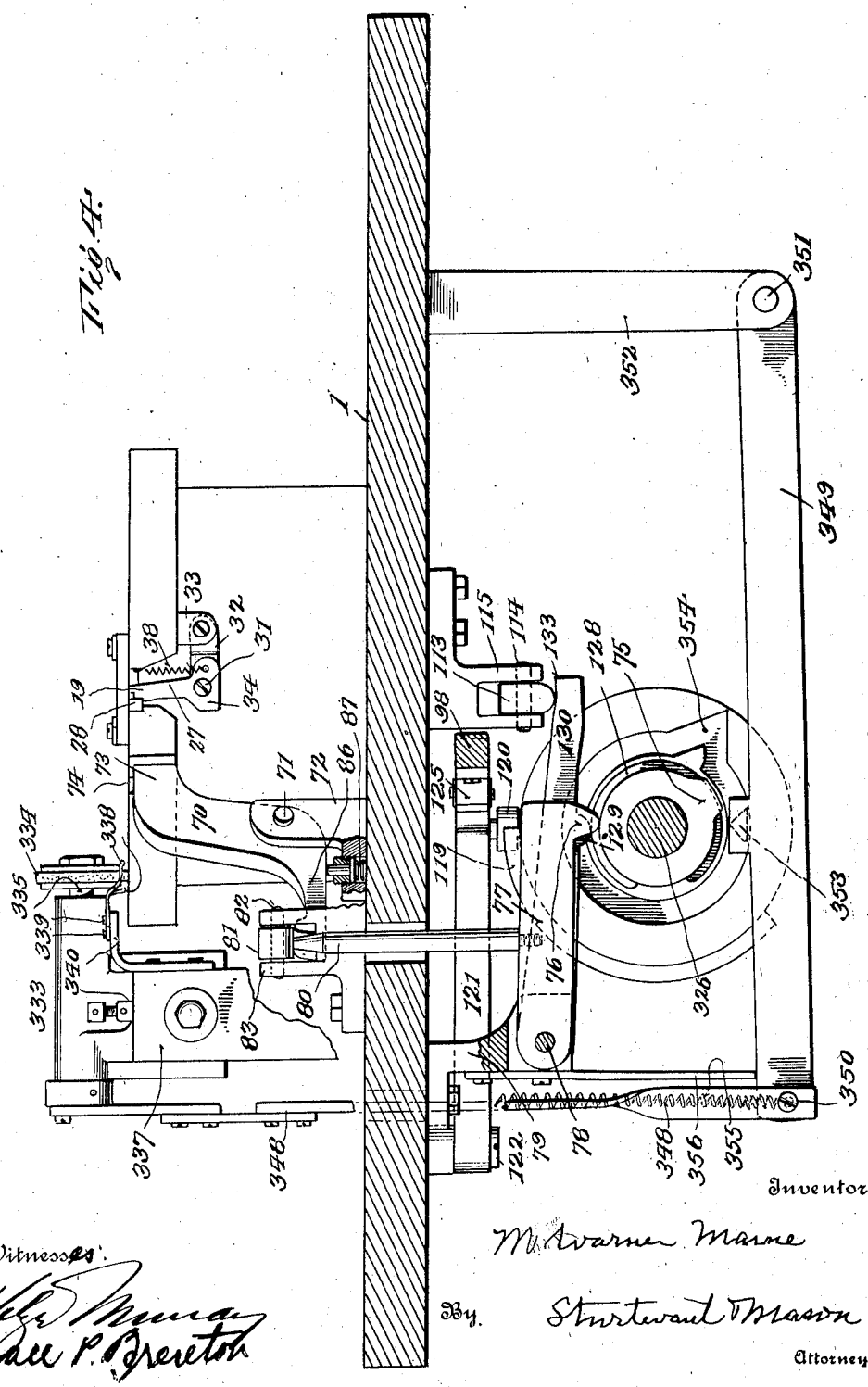
Fig. 4 is a detail transverse sectional view upon the line 4—4 of Fig. 3 showing the controlling mechanism and cams for effecting the movement of the needle spacing and positioning wiper, and the locking lever for the intermittently rotated needle support.

Referring to Figs. 2 and 4, the locking device 25 hereinbefore referred to comprises a locking lever 70 pivoted at 71 upon suitable supports 72 extending upwardly from the bed 1 of the machine. The lever 70 is provided with a locking nose 73 designed to engage intermittently the recesses 74 formed on the periphery of the needle head support 18. There are eight recesses 74 shown, corresponding in number to the operating stations at which the needle, in the process of being straightened, is stopped. The mechanism for controlling the operation of the locking lever 70 and more especially the releasing thereof from one of the recesses 74 when the needle support is to be rotated, comprises a cam 75 coöperatively associated with the nose 76 of the lever 77 pivoted at 78 on the depending bracket 79 beneath the bed of the machine; and also comprises a vertically extending rod 80 secured to the lever 77, the upper end of which bears against one arm of a lever 81 pivoted at 82 to a bracket 83 provided on the upper surface of the bed of the machine. The opposite arm 84 of the lever 81 is secured at 85 to the arm 86 of the locking lever 70.

By this construction it will be seen that as the nose of the cam 75 lifts the nose 76 of the lever 77 the vertical rod 80 will lift one arm of the lever 81, thereby depressing the opposite arm thereof by means of the connection 85 depressing the arm 86 of the locking lever 70, and retracting the locking nose 73 of said lever from one of the recesses 74 in the needle supporting head 18. A spring pressed pin 87 bears against the under side of the arm 86 of the locking lever 70 and serves to force the nose 73 of said locking lever into the succeeding recess 74. As will be seen, the frictional drive of the supporting head 18 is intermittently interrupted for the purpose of permitting the operation of the straightening devices at the other associated stations.

*Needle loading mechanism.*

Referring to Figs. 2, 3, 8 and 9, the loading head 88 is designed to transfer a needle from the needle feeding mechanism to be hereinafter described, and deliver it to the needle retaining device in the needle supporting head with the flat side of the shank of the needle perpendicular. The loading head comprises a revoluble sleeve 89, needle gripping jaws 90 and 91, and meshing beveled gears 92 and 93, the former of which is secured to a shaft 94 extending through the loading head 88 and to which the needle gripping jaws 90 and 91 are relatively attached, and the latter of which beveled gears 93 is rigidly fixed by means of the set screw 95 to a stationary sleeve 96. The lower end of the revoluble sleeve 89 has secured thereto the segmental gear 97 with which meshes a longitudinally slidable rack 98 mounted beneath the bed of the machine. The sleeve 96 extends through a reciprocating block or slide 99 horizontally movable in guides 100 secured to the bed of the machine by screws 101. A spring 102 is interposed between the slide 99 and the pin 103 projecting from the bed of the machine. The purpose of this spring is to normally hold and retract the loading slide 99 against a suitable adjustable stop 104 secured to the bed of the machine.

The needle gripping jaws 90 and 91 are held in a bifurcated end 105 of the shaft 94 and are designed to grip a needle from the feeding device with the flat side of the shank of the needle up or horizontal and deliver it to the needle support with the flat side of the shank of the needle perpendicular. The gripping jaw 90 is pivoted at 106 to the bifurcated slot 105 and is provided with a needle gripping nose 107 which may be V-shaped or recessed to conform to the curvature of the blade of the needle, and a depending oppositely disposed arm 108 against which operates the nose of a horizontally movable pin 109 movable in an opening formed through the shaft 94. An arcuate opening is provided in said shaft 94 to permit the latter to swing a quarter turn without interfering with the vertically movable rod 112. A beveled end 110 is formed on the end of the pin 109 and is designed to coöperate with a similar beveled surface 111 provided on the upper end of a vertically movable rod 112 positioned in the revoluble sleeve 89 of the loading head, and having its lower end designed to abut against the upper surface of the lever 113 pivoted at 114 to a suitable bracket 115 depending from the under side of the bed of the machine.

Figure 9:
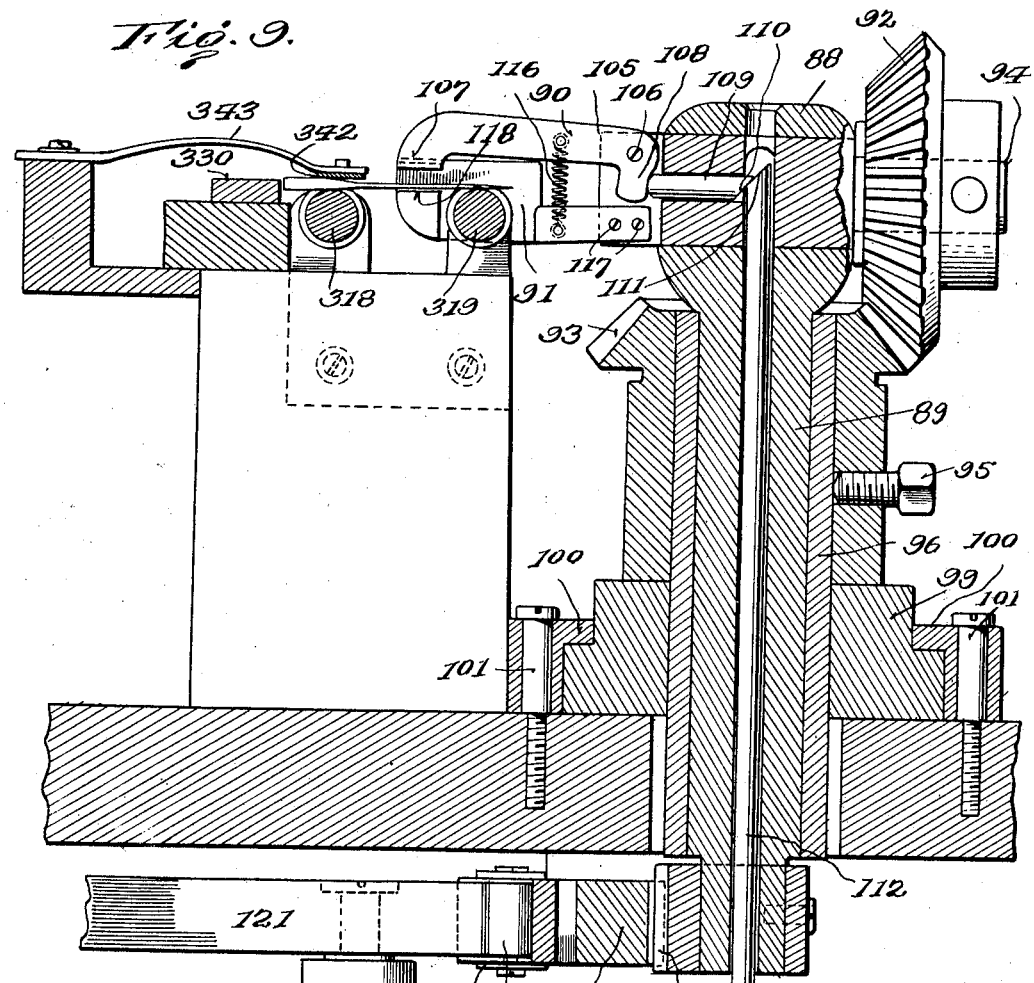
Fig. 9 is an enlarged vertical sectional view of the feeding mechanism and the loading head, illustrating the lower lever connection for turning the same.
Figure 10:
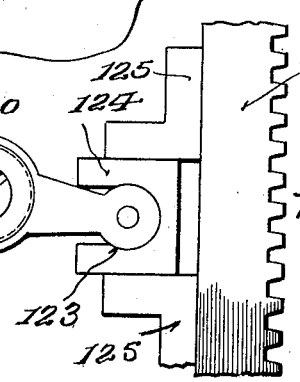
Fig. 10 is a detail plan view of the lever connection shown in Fig. 9.
Figure 21:
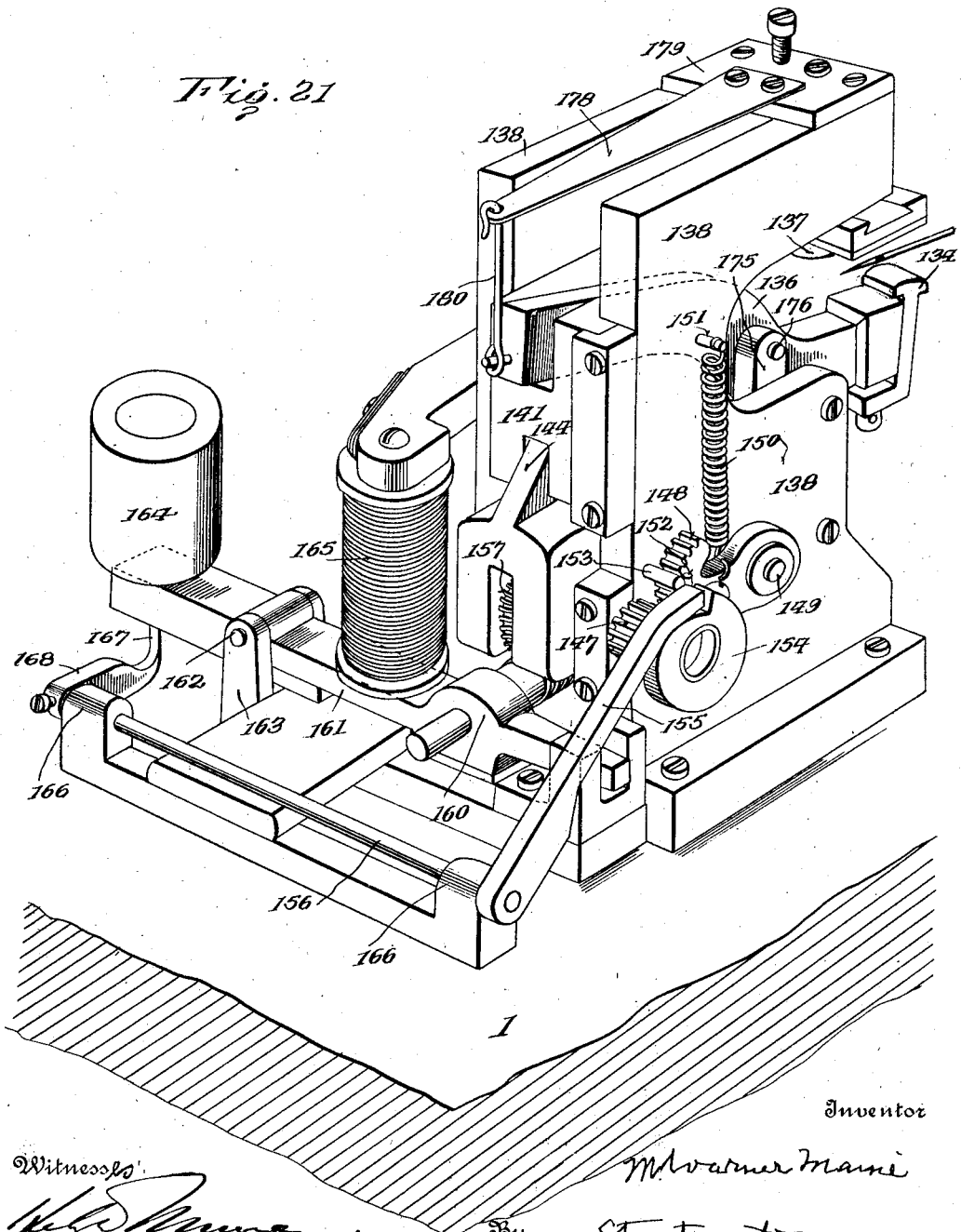
Fig. 21 is a perspective view of one of the needle straightening devices which delivers a blow to the under side of the needle for removing the top side crook therefrom.

By this construction it will be seen that the movement of the lever 113 in an upward direction by mechanism to be presently described, causes the rod 112 to lift whereupon the sliding of the aforesaid beveled surface 111 upon the mating beveled surface 110 causes the pin 109 to be moved outwardly against the arm 108 of the needle gripping lever 90, and thereby permits the gripping nose 107 thereof to move away from the blade of the needle as shown in Fig. 9. A spring 116 is interposed between the movable gripping jaw 90 and the fixed gripping jaw 91, which latter is secured within the bifurcated end 105 of the shaft 94 by screws 117. The fixed gripping jaw 91 is provided with a gripping nose 118 between which and the nose 107 and the movable gripping jaw, the blade of the needle is held.

*Mechanism for controlling operation of loading head.*

Referring to Figs. 3, 4, 8, 9 and 10, the mechanism for effecting the gripping of the needle, turning of the needle from the position with its flat side of the shank up to the position with its flat side of the shank perpendicular, and inserting it within one of the chucks 19 of the needle support comprises, among other things, a cam groove 119 in which operates a roller 120 mounted upon the end of a lever 121 pivoted at 122 to the under side of the bed of the machine; the sliding rack 98 hereinbefore referred to as meshing with the segmental gear 97; and an operating head 123 positioned within a movable block 124 interposed between guides 125 secured to the rack 98. A movable block 124 is suitably held in the guides 125 by means of screws and washers 126 positioned upon the upper and lower sides of the head 123.

Figure 3:
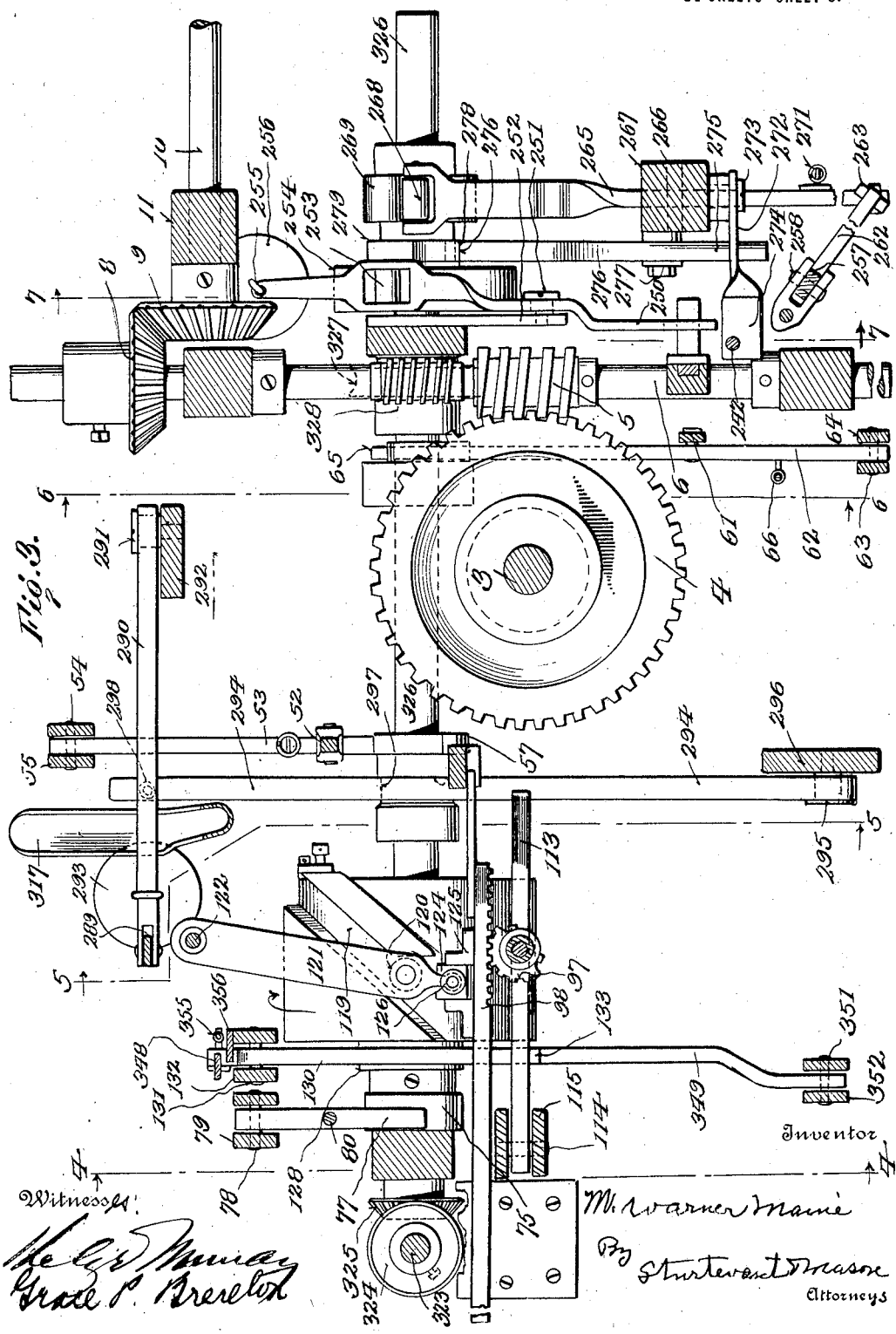
Fig. 3 is a plan view upon enlarged scale of the mechanism located immediately beneath the bed of the machine for operating the straightening devices positioned above said bed.

By this construction it will be seen that as the cam groove 119, in which the roller 120 operates, is moved in the direction of the arrow shown in Fig. 3 the lever 121 will move, thereby causing the head 123 to move the rack 98 in the direction of the arrow indicated thereon; whereupon the segment 97 secured to the sleeve 89 of the loading head will be rotated until the shaft 94 of said loading head strikes against the adjustable stop 127, whereupon the continued movement of the lever 121 through the cam groove and roller action will cause the loading head to bodily move inwardly toward the needle support, in the direction of the arrow indicated on the slide 99 in Fig. 2, against the action of the spring 102. As soon as the roller 120 leaves the end of the groove 119 the spring 102 acts to retract the slide 99 of the loading head, and as the rack 98 is moved in the reverse direction the segment gear 97 will be rotated and the loading head swung back to its initial position for gripping another needle.

The mechanism for releasing the gripping jaws 90 and 91 from the blade of the needle after it has been inserted in one of the chucks 19 of the needle support, includes a cam 128 designed to coöperate with a nose 129 provided on the lever 130 pivoted at 131 between ears 132 depending from the under side of the bed of the machine. The end 133 of the lever 130 bears against the under side of the lever 113, hereinbefore referred to. It will be seen that when the cam 128 acts upon the nose 129 of the lever 130 the end 133 of the latter lifts the lever 113 against the pin 112, causing the upper beveled surface thereof to operate upon the mating beveled surface of the pin 109 as hereinbefore described. The operation of this mechanism just described is timed with the other associated mechanisms of the machine so that the needle to be straightened is first gripped after having been spaced by the feeding mechanism, swung a quarter turn for insertion into one of the radial chucks, and at the same time revolved a quarter turn from the position with the flat side of the shank up, to the position with the flat side of the shank perpendicular, by reason of the rolling of the beveled gear 92 secured to the shaft 94 upon the stationary beveled gear 93, then it is moved inwardly by the loading head and positioned in one of the chucks 19 of the needle support during the time that the said needle support is in non-rotatable or intermittently locked position.

*Station for taking out top side crook in needle.*

Referring to Figs. 2, 21 to 24, inclusive, and 28 to 30, inclusive, a straightening device for removing the top side crook in the needle is located adjacent the loading mechanism in the counter-clockwise path of travel of the needle support. The top side crook in the needle is indicated in dotted lines in Fig. 29 by the letter T. After the needle has been inserted in one of the chucks of the needle support by the loading mechanism it is moved to the first station and positioned between an anvil and a straightening hammer designed to deliver a gradually increasing blow upon the under side of the needle. When the needle is positioned at this first station with the blade thereof contacting with the anvil of the straightening device, the electrical circuit for maintaining the effective operation of the hammer is closed and will remain so until the top side crook has been hammered out of the needle, whereupon the blade of the needle springs away from the anvil and the electrical circuit is broken and the straightening hammer rendered ineffective.

The straightening stations for removing the top side crook from the needle, now to be described, is similar in construction to the succeeding station for removing the unnatural crook after the needle has been turned by the needle turning mechanism to be presently described, and a description of but one of these stations will be given. Referring particularly to Figs. 21 to 24 inclusive, the mechanism for removing the top side crook of the needle comprises, among other things, a straightening hammer 134 adjustably mounted by means of the pin-and-slot connection 135 upon one end of a hammer lever 136; a coöperating anvil 137 adjustable between overhanging brackets 138 by means of screws 139, means for continuously vibrating the hammer, and means for rendering the vibrations of said hammer effective against the needle as will presently be described. The brackets 138 extend from the base 140 positioned upon the bed 1 of the machine. Vertically movable between the brackets 138 is a shifting pivot block 141 in which the opposite end of the hammer lever 136 is pivoted, as at 142. The movable block 141 is H-shaped in construction and has pivotally mounted in the lower portion thereof upon a pin 143 a bifurcated block 144, in the lower end of which are mounted oppositely disposed eccentrics 145 formed on a shaft 146 having bearings in the brackets 138. One end of the shaft 146 protrudes through one of the side brackets 138 and has keyed thereto a pinion 147 designed to mesh with a spring actuated arcuate segmental rack 148 pivoted at 149 to one of the brackets 138. The spring 150 is interposed between the segmental rack 148 and a pin 151 projecting from side bracket 138.

A pin 152 projects from the shaft 146 adjacent the pinion 147 and is designed to abut against a stop pin 153 carried by the bracket 138 to limit the rotary movement of the pinion 147. Secured to the end of the shaft 146 is an eccentric 154 designed to coöperate with a pivoted arm 155 secured to a rock shaft 156, to be presently described.

Interposed between the eccentrics 145 carried by the shaft 146 is a worm-gear 157 designed to engage and disengage a worm 158 under effective hammering operation and an ineffective hammering operation, respectively. A worm 158 is secured to a shaft 158' to one end of which is secured a driving pinion 159 which meshes with the under toothed surface 69 of the master gear 67 for transmitting motion thereto, and the other end of which has a bearing 160 in one end of a lever 161 pivoted at 162 in a bracket 163. The opposite end of the lever 161 is designed to receive a weight 164 which serves to keep the armature end of the lever 161 against an electro-magnet 165 of an electrical circuit, to be hereinafter described. When the coil 165 is energized by the closing of the electrical circuit through the needle, the armature end of the lever 161 is drawn upwardly against the end of the coil, thereby bringing the worm 158 into mesh with the worm gear 157 and causing the shaft 146 to rotate. As the shaft 146 is rotated the eccentrics 145 are revolved and shift the bifurcated block 144 so that the H-shaped slide 141 will be vertically reciprocated and the pivotal connection 142 of the hammer lever gradually changed. As shown in Fig. 22 of the drawings, a worm 158 is in engagement with the worm gear 157 and the eccentrics 145, and positioned so that the pivotal connection 142 of the hammer lever is in its substantially uppermost position. As the shaft 146 is revolved in the direction of the arrow shown on the eccentric 154 the bifurcated block 144 will be lowered and the pivotal connection 142 correspondingly brought to a lower lever. The shifting of the pivotal point 142 of the hammer lever 135 causes the delivery of an increasing blow to the needle. When the crook in the needle has been removed the blade thereof breaks away from the anvil, the electrical circuit is broken, the coil 165 deënergizes and the lever 161, with its bearing 160 for the shaft 158', is lowered, thereby disengaging the worm 158 from the worm gear 157 and thus preventing the imparting of any movement for shifting the pivotal connection 142 of the hammer lever. In order that the lever 161 will readily drop from the coil 165 the rock shaft 156, mounted in bearings 166, is caused to move through the pivoted arm 155 riding upon the increasing eccentric surface of the eccentric 154, and thereby elevate an arm 167 of the lever 168 secured to the opposite end of the rock shaft 156, and in so doing lift the weight 164 by means of a depending pin 169 from off the end of the lever 161 so that the said lever will drop readily when the magnet is deënergized, and thereby disengage the worm-gear 157 from the worm 158.

The mechanism for continuously vibrating the hammer 134 comprises a shaft 170 to the inner end of which is secured a beveled pinion 171 designed to mesh with the upper toothed surface 68 of the master gear 67. The inner end of the shaft 170 is journaled in a bearing block 172 and has keyed to it adjacent the said bearing block a cam 173 designed to operate upon a mating surface 174 formed on a hammer vibrating slide 175 vertically reciprocable between the brackets 138. The upper end of the hammer vibrating slide is connected to the hammer lever 136 by a pin 176. A guide block 177 is interposed between the brackets 138 for insuring the even reciprocation of the hammer vibrating slide. By this construction it will be seen that as the shaft 170 is continuously rotated by reason of the pinion 171 meshing with the master gear 67, the cam 173 will elevate and lower the vibrating slide 175 and impart a vibrating movement to the hammer 134.

The effectiveness of the hammer, or in other words, the striking force thereof, is determined by the relative position of the pivotal connection 142 of the hammer lever. When the circuit is closed through the needle and the shaft 146, the eccentrics are operated to pull the pivotal connection 142 downwardly, thus varying the point at which the stroke of the hammer terminates and in effect increasing the force of the blows upon the needle. The circuit is broken by virtue of the crook having been hammered out of the needle, whereupon the worm gear 157 and worm 158 will become disengaged and the spring actuated segmental gear 148 which meshes with the pinion 147 acts to return the eccentrics 145 and the larger eccentric 154 to their normal position until the pin 152 carried by the shaft 146 strikes against the stop pin 153. The hammer lever 136 is spring controlled by means of the cam spring bar 178 extending from a cross bar 179. A link 180 connects the outer end of the spring bar 178 with the hammer end of the hammer lever 136.

The anvil 137 upon which the needle is straightened is mounted upon a block 181 positioned adjustably between the brackets 138 and is connected by an electric conductor leading to the coil 165. The anvil 137 is insulated from the block 181 by insulation 182. The electrical circuit which is grounded upon the machine is thereby prevented from passing through the anvil except it be when the needle blade is in contact therewith during the straightening operation. The shafts 158' and 170 which transmit motion to the straightening device just described, are mounted in adjustable bearings 183 and 184, respectively, provided in the hub section 14 of the needle support. This provides a convenient adjustment in locating and alining the shafts with relation to the master gear 67 and the hereinbefore described mechanisms associated with the opposite ends of the shafts 158' and 170.

*Station for taking out bottom side crook in needle.*

Adjacent the straightening station just described is another straightening station for removing the bottom side crook in the needle indicated in dotted lines in Fig. 29 of the drawings by the letter B. The operation of this station is somewhat similar to the one just described, except that it is caused to actuate a hammer which delivers a blow to the top side of the needle. Referring to Figs. 2, 18, 19 and 20, the straightening station now to be described comprises a hammer 185 adjustably mounted by means of screws 186 and a slot 187 upon the inner end of a hammer lever 189 pivotally connected at 190 to a block 191 vertically movable between brackets 192 extending from a base 193 positioned on the bed 1 of the machine. Operating within recess 194 formed in the block 191 is a head 195 projecting upwardly from the bifurcated block 196 coöperatively associated with eccentrics 197 secured to a shaft 198. The shaft 198 is journaled in blocks 199 secured to the brackets 192 and is provided at one end with a pinion 200 adapted to mesh with a segmental rack 201 pivoted at 202 to one of the brackets 192. A spring 203 controls the return movement of the segmental rack 201 in a manner similar to the operation upon the segment 148, described in the preceding station. A pin 204 is carried by the shaft 198 and is designed to limit the movement of said shaft by abutting against the stop pin 205 extending from the bracket 192. Upon the outer end of the shaft 198 is an enlarged eccentric 206 designed to lift an arm 207 secured to a rock shaft 208, to be presently described. Interposed between the eccentrics 197 on the shaft 198 is a worm-gear 209 adapted to mesh with a worm 210 secured to a shaft 211. The shaft 211 is provided at its inner end with a pinion 212 which meshes with the under toothed surface 69 of the master gear 67. The opposite end of the shaft 211 is journaled in the bearing 213 provided on one end of the lever 214 pivoted at 215 between brackets 216. The lever 214 is designed to contact with the armature end of a coil 217 when the latter is energized, thereby causing the shaft 211 to be elevated and the worm 210 to engage the worm gear 209. The rock shaft 208 is mounted in bearings 218 and has secured to one end, an arm 219 the inner end of which is designed to lift gradually a weight 220 during the meshing of the worm-gear 209 and worm 210 and the rotation of the eccentric 206, for permitting the dropping of the lever 214 without interference when the coil 217 is deënergized.

The mechanism for vibrating the hammer comprises a shaft 221 to the inner end of which is secured a pinion 222 designed to mesh with the upper toothed surface 68 of the master gear 67, said inner end being journaled in a bearing block 223 and has secured thereto a cam 224 designed to coöperate with a projecting surface 225 formed on a hammer vibrating slide 226 vertically movable between the brackets 192. The upper end of the vibrating hammer slide 226 is secured to the hammer lever 189 at 227. A spring 228 is interposed between an arm 229ª protruding from the hammer lever and rock shaft 208. This permits of the spring action being imparted to the hammer during the vibrating movement.

The anvil 229 upon which the needle is straightened is connected by an electric conductor to the coil 217 and is insulated from the supporting block 230 by suitable insulation 231. The anvil 229 is adjustable between the brackets 192 by means of screws 232 shown in Fig. 18 of the drawings.

The inner ends of the shafts 211 and 221 are respectively journaled in bearings 233 and 234. These bearings are adjustably positioned within the wall of the hub section 14 of the needle support.

The operation of the foregoing needle straightening station is as follows: The needle having been brought from the preceding straightening station to the one just described, it is now interposed between the anvil 229 and the hammer 185 with the blade of the needle contacting with said anvil. When in this position the electrical circuit is closed through the coil 217, thereby causing the lever 214 to be drawn against the under side of said coil and meshing the respective gears 209 and 210. These gears being in mesh the shaft 198 and eccentrics 197, together with the larger eccentric 206, are rotated in the direction of the arrow shown in Fig. 19, and the bifurcated block 196 is caused to move upwardly, thereby allowing the pin 195 to force the block 191 upwardly, whereupon the pivotal connection 190 of the hammer lever 189 is shifted. The shifting of this pivotal connection 190 causes the varying of the point at which the stroke of the hammer 185 terminates, thereby in effect causing it to deliver blows of gradually increasing strength to the blade of the needle until the bottom side crook in the needle is hammered out. When this crook has been removed from the needle the blade no longer contacts with the anvil 229. The electrical circuit is thus broken, deenergizing the coil 217 and permitting the lever 214 to drop, and disengage the gears 209 and 210. When in this position the hammer is still vibrated but it is no longer effective upon the blade of the needle because of the shifting of the pivotal connection 190 of the hammer lever. The station for taking out the bottom side crook which has just been described is similar in construction to the succeeding stations for removing the natural crook near the shank of the needle, and the natural crook near the point of the needle, and these latter stations will be referred to again, but not described in detail.

*Needle turning station.*

The next step in the course of the needle straightening operation is to turn the needle from the position with the flat side of the shank perpendicular to a position with the flat side of the shank up or horizontal. This mechanism comprises a reciprocating slide and coöperating gripping jaws which move inwardly to grip the blade of the needle; withdraw the same from the retaining chuck 19 when the chuck releasing mechanism has been operated, as has been hereinbefore described; give the needle a quarter of a turn; and again insert the needle within the same chuck from which it was withdrawn, whereupon it will be again gripped between the chuck jaws, as has been hereinbefore described. The gripping jaws are substantially similar in construction to those shown and described in connection with the loading mechanism.

The turning mechanism comprises, among other things, a support 235, in the upper end of which is mounted an oscillatory shaft 236 having secured thereto a pinion 237 adapted to mesh with a vertically reciprocating rack 238; and means including a series of levers, to be presently described, for operating the said rack, The gripping jaws 239 are normally held together by a spring 240. This spring 240 is a sheet steel horseshoe shaped spring which presses the jaws 239 together except when opened for gripping and turning the needle by the up movement of the rod 242, which conveys motion through the short rod 241, having the wedge end that moves between the jaws 239. The jaws are designed to be separated by means of a horizontal pin 241 having a beveled inner end coöperatively associated with the similarly beveled end of a vertically movable rod 242 extending through the support 235 beneath the bed of the machine. The operation of these coöperating beveled surfaces and the pin 241 for releasing the gripping jaws 239 is the same as that shown and described in connection with the loading head and the gripping jaws 90 and 91 thereof.

The vertically movable rack 238 which operates to turn the gripping jaws a quarter turn when the needle has been gripped and withdrawn from one of the chucks 19, is connected at its lower end to a lever 243 pivoted at 244 in a bracket 245. The bracket 245 is mounted upon a slide 246 upon which the turning station support 235 is arranged. The slide 246 is movable toward and away from the needle support in guides 247. Secured to the lever 243 is a depending link 248, the lower end of which is engaged by the bifurcated end 249 of the lever 250 pivoted at 251 to a support 252. The lever 250 is provided with a roller 253 designed to cooperate with a cam 254 which controls the movement of the lever and in turn the vertical reciprocation of the rack 238. Upon the outer end of the lever 250 is secured a rod 255, to the lower end of which is connected a weight 256 for insuring the operation of the turning mechanism. By this construction it will be seen that as the roller 253 drops on the lower portion of the cam 254 the bifurcated end 249 of the lever 250 will lift the depending arm 248, thereby elevating the lever 243 and in turn move the rack 238 upwardly. This latter operates to revolve the pinion 237 keyed to the shaft 236 for giving a quarter turn to the gripping jaws 239 secured in the bifurcated end of the shaft 236. A continued movement of the cam 254 will return the gripping jaws to their normal position for turning the succeeding needle at this station. The mechanism for moving the turning head toward and away from the needle support comprises a lever 257 pivoted at 258 to the under side of the machine, the upper arm 259 of which is connected by a link 260 to the bracket 261 secured to the slide 246. The opposite end 262 of the lever 257 has secured thereto a depending link 263, to the lower end of which is connected one end 264 of a lever 265 pivoted at 266, to a support 267, depending from the under side of the machine. The inner end of the lever 265 is provided with a roller 268 coöperatively associated with a cam 269. A spring 270 is interposed between the depending arm 271 of the lever 265 and the bed of the machine.

In operation it will be seen that as the roller 268, carried by the lever 265, is lifted by the cam 269 the end 264 of said lever will be depressed, thereby rocking the lever 257 and imparting an outward reciprocation to the slide 246. The continued movement of the cam will permit the slide to move inwardly when gripping the needle for the turning operation. These mechanisms are properly timed with respect to the other associated mechanisms of the machine and operate to move the slide and turning head inwardly when the needle support is in locked position; grip the needle and withdraw the same in an outward direction; turning the same a quarter turn and again inserting the needle within the needle support, during which time the needle support has remained stationary.

The timed mechanism for actuating the releasing and gripping action of the jaws 239 comprises a lever 272 pivoted at 273, the outer end 274 of which bears against the depending pin 242, hereinbefore described.

Coöperating with the under side of the lever 272 is one arm 275 of a lever 276 pivoted at 277 to a support depending from the machine. The opposite end 278 of the lever is coöperatively associated with a cam 279 which acts to rock the lever 276 at timed intervals for imparting movement to the lever 272 which is turn, through its end 274, acts to lift the pin 242 for releasing the jaws 239 from the needle.

*Station for taking out unnatural crook in needle.*

Subsequent to the turning of the needle from the position with the flat side of the shank perpendicular to the position with the flat side of the shank up or horizontal, another straightening device for hammering on the bottom of the needle to take out the unnatural crook is brought into operation. This step is identical in construction and operation with that at the station for taking out the top side crook in the needle, hereinbefore referred to in connection with Figs. 2, 21, 24 and 28 to 30, inclusive, and a repetition of the description of this mechanism both in structure and operation will not be given.

The unnatural crook which this step is designed to hammer out is indicated by the dotted lines lettered U in Fig. 30 of the drawings. The unnatural crook in the needle is that crook found to exist opposite to the natural crook resulting upon the opposite side of the blade of the needle in which the groove in the needle is formed. This unnatural crook does not always appear as a result of the tempering process, but the step is provided to insure the removal of same should such be found to exist.

*Station for taking out natural crook near shank of needle.*

The station for removing the natural crook from the needle near the shank thereof or about half way down the blade of the needle from the shank is next brought into operation in the course of the straightening process, and hammering on the top side of the needle takes out the said natural crook. This straightening station is identical in construction with that station hereinbefore described in connection with Figs. 2, 18, 19 and 20, for taking out bottom side crooks in the needle. In the detailed description the construction and operation of this station will not be given. The natural crook found in the needle about half way down the blade from the shank is indicated in dotted lines by the letter N in Fig. 30 of the drawings. This natural crook in the needle is due to the hardening and tempering process to which the needle is subjected. This station will remain in operation upon the needle until this crook is removed, after which the needle is fed to the succeeding and last straightening station.

*Station for taking out natural crook in needle near point of blade.*

This station is identical in construction with the preceding straightening station with the exception that the hammer thereof is caused to operate upon the blade of the needle substantially between the point and an intermediate portion of the blade. It is also identical in construction with the straightening station for taking out the bottom side crook in the needle, and a detailed description of the construction and operation thereof having been given in connection with this last named station a further description will not be repeated. The natural crook in a needle between the intermediate portion of the blade and the point thereof is indicated in dotted lines in Fig. 30 and referred to by the letter N'. The natural crook is substantially a continuation of the natural crook heretofore described, and is best removed by the operation of mechanism of two distinct stations, one operating near the shank of the needle and the other nearer the point thereof. As soon as the last crook in the needle is removed, the effective hammering operation upon the blade of the needle will be stopped and the needle conveyed by the needle support to the ejecting mechanism hereinbefore referred to.

Referring to Figs. 2, 5, and 11 to 14, inclusive, the mechanism for ejecting the straightened needles comprises movable gripping jaws designed to move toward and away from the needle support, means for operating the jaws to grip the straightened needle, and means for releasing the jaws and delivering the same to a hopper and chute leading to the needle receiving pan. The gripping jaws 280 are pivotally mounted in the standard 281 formed on one end of the slide 282. The slide is supported on arms 283 and 284 pivotally secured at 285 and 286 to a block 287 secured to the bed of the machine. The arm 284 is provided with an extension 288 to which is secured one end of a link 289, the other end of said link being attached to a lever 290 pivoted at 291 to a bracket 292 depending from the bed of the machine. A weight 293 depends from the lever 290, and serves to keep another lever 294, pivoted at 295 on a bracket 296, on the nose of a cam 297. An adjustable screw 298 permits of the relative positioning of the lever 290 above and in contact with the lever 294. By this construction it will be seen that as the nose of the cam 297 rides beneath the nose 299 of the lever 294 the latter is elevated and in turn causes the lever 290 to be raised through the adjustable screw 298, thereby elevating the link 289 and rocking the arm 284 on its pivot 286, and causing the movable slide 282 to move inwardly toward the needle support. The arm 283 connected to the slide 282 swings simultaneously with the arm 284. As the nose of the cam 297 leaves the nose 299 of the lever 294 the weight 293 depending from the lever 290 serves to return the slide in an outward direction away from the needle support for delivering the straightened needle to the hopper and chute.

The mechanism for gripping and releasing the jaws 280 when the needle is taken from the support and delivered to the chute and hopper comprises a bar 300 relatively movable with relation to the slide 282, an adjustable block 301 secured to said bar 300 and movable therewith, a coöperating lever 302 pivoted at 303 upon a suitable bracket extending from the bed of the machine, a stop 304 against which the adjustable block 301 is designed to strike upon the outward movement of the bar 300, and a stop 305, against which the arm 283 which supports the slide 282, strikes, in limiting the outward movement of the ejecting slide.

Figure 5:
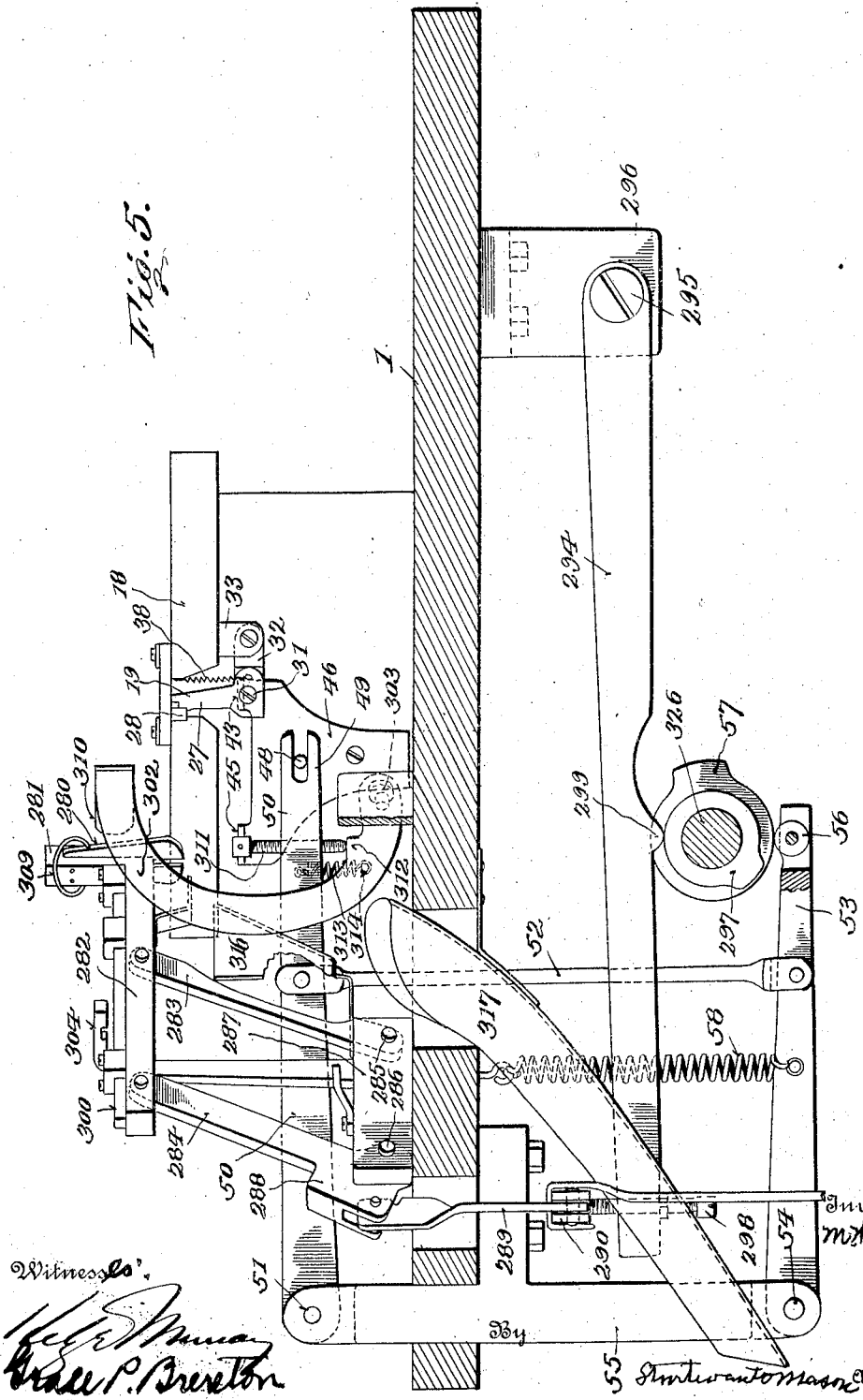
Fig. 5 is a similar transverse sectional view indicated on the line 5—5 of Fig. 3 showing the controlling mechanism for ejecting the straightened needles and the coöperating devices for holding and releasing the needles and the chucks carried by the intermittently rotated needle support.

The bar 300 moves with the slide 282 and is relatively movable therewith through guide blocks 306 secured to the slide 282. The bar 300 is provided with a reduced end 307 being formed integral with the major portion of the said bar and reduced therefrom by the tapering sides 308 (see Figs. 12 and 13). The reduced end 307 and bar 300 pass between the pivoted gripping jaws 280 and are designed in conjunction with the tapering sides 308 of the major portion of the bar to retract or expand the said gripping jaws, as shown in section in Figs. 12 and 13. The bar 300 is tapered at the jaw end so that it will slide from the small to the large part to open the jaws without much friction. The jaws 280, Fig. 5, are always open except when the whole jaw carrier rocks forward (on the pins 285, 286) and the jaws straddle the needle and the dial; and then the curved bar extension 310 pushes out the bar 300 and the jaws are forced together by the wire horseshoe spring 309. The push bar 300 is forced back on the first part of the travel of the lever 50 and the last one-eighth travel of the lever pulls down the needle grip 27 or 28, Fig. 5, which is accomplished by the right angle bend on the left of the triangular piece 46, Fig. 5, which is fastened to the slide 47, see Fig. 15. The release of the needle is accomplished by the adjustable dog 301, Fig. 11 hitting the stationary stop 304, thereby forcing the thick end of the bar between the jaws. This is shown plainly in Figs. 12 and 13. A spring 309 connected to the gripping jaws serves to normally press the latter against the sides of the bar 300 and the reduced end 307 thereof. In the position of the jaws shown in Fig. 12 of the drawing the bar 300 has been moved to spread the gripping jaws 280, for releasing the needle therefrom when the ejected device has been moved over the hopper and chute, and when the said device has been returned to grip another straightened needle and eject the same. In Fig. 13 the bar 300 is shown in the position when the gripping jaws 280 are securely holding a needle therein during the time of its withdrawal from the needle support and its positioning over the hopper and chute. In this position the end 310 of the lever 302 has forced the rod 300 inwardly through the guide blocks 306 in the direction of the arrow shown and caused the spring 309 of the gripping jaws to force the same against the sides of the reduced end 307 of the bar 300.

The mechanism for controlling the operation of the lever 302 consists of an adjustable screw 311 designed to pass through the lever 50 (see Figs. 5 and 11), the lower end of said screw being designed to abut against a shoulder 312 formed on the lever 302. A spring 313 is interposed between the lever 50 and the pin 314 projecting from the lever 302, and serves to keep the end of the screw 311 against the shoulder 312. By this construction it will be seen that as the lever 50 is depressed by the link connection 52 extending from the lever 50 to the lever 53, which latter is controlled by the cam 57 hereinbefore described, the adjustable screw 311 will bear against the shoulder 312 and cause the lever 302 to rock on its pivot 303, thereby bringing the end 310 of said lever against the reduced end 307 of the bar 300 and moving the same upon the slide 282 slightly in advance of the outward movement of said slide in the direction of the arrow shown in Fig. 13. The movement of the bar 300 at this time permits the jaws 280 to grip the straightened needle. This operation is substantially timed with the operation of the movable plate 46 which coöperates with the chucks or needle retaining devices 19 for the releasing of the needle from said chucks to permit of its being carried by the ejecting mechanism to the hopper and chute. Following the gripping movement of the jaws 280, just described, the slide 282 of the ejecting mechanism is moved outwardly by the levers and cam connection hereinbefore referred to. The slide 282 moves in the direction of the arrow shown thereon in Fig. 13, carrying with it the bar 300, until the stop block 301 abuts against the stop 304 at which time the bar 300 is held against further movement. The continuation of the movement of the slide 282 in the direction of the arrow shown in Fig. 13 causes the said slide to move outwardly with relation to the bar 300, thereby carrying the gripping jaws 280 against the tapering sides 308 of the bar 300 until the gripping jaws have reached the position shown in Fig. 12 of the drawings, at which time, the needle is released from said jaws and permitted to drop into the hopper. The blade of the straightened needle, when liberated by the gripping jaws 280, strikes the projection 315 depending from the slide 282 for deflecting the needle into the hopper 316 with the shank of the needle heading downwardly. The hopper is opened at its bottom and may be supported in any suitable manner beneath the ejecting slide. Beneath the hopper is positioned a conveying chute 317 leading to the needle receiving pan, to be presently described. The ejecting slide is moved inwardly after releasing the straightened needle with the jaws still spread for engagement with another needle in the same manner as previously described.

*Needle feeding mechanism.*

Figure 8:
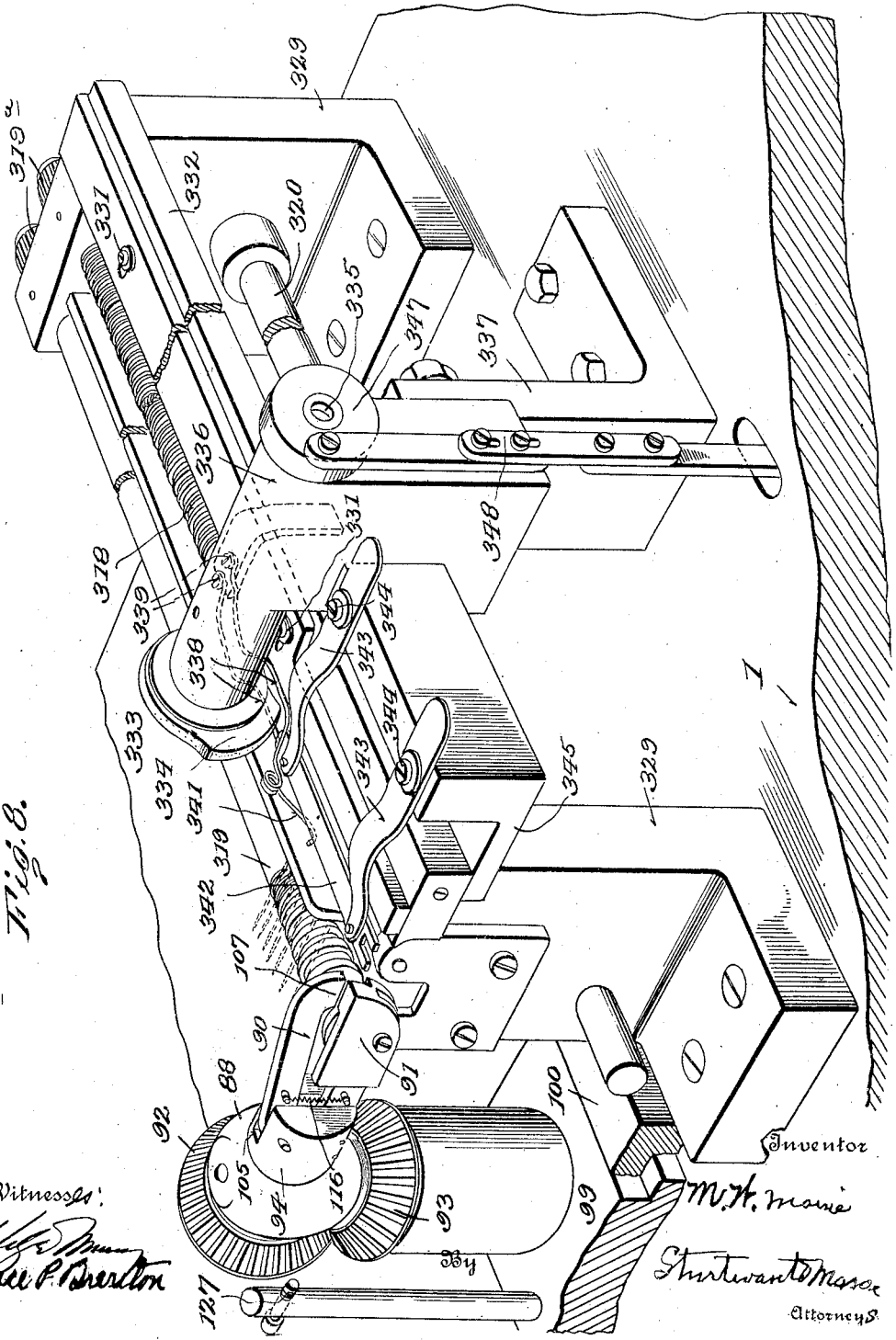
Fig. 8 is an enlarged perspective view of the needle feeding and spacing mechanism and the loading head for gripping a needle which has been spaced and delivering it to the chuck in the needle support.

Referring to Figs. 1, 2, 4, 8 and 9, the mechanism for feeding and spacing the unstraightened needles to the loading head hereinbefore referred to, comprises a needle feeding screw 318 and a relatively spacing screw 319 receiving relative motion from a train of gears 319ᵃ of a shaft 320. The shaft 320 is rotated by means of the beveled gear 321 keyed thereto and adapted to mesh with a similar gear 322 provided on the upper end of a shaft 323 extending through the bed of the machine. The lower end of the shaft 323 is keyed to a beveled pinion 324 designed to mesh with a similar pinion 325 keyed to one end of the cam shaft 326, upon which latter the hereinbefore mentioned cams for controlling the several mechanisms are secured. The cam shaft 326 is provided with a worm gear 327 (see Figs. 1 and 6) adapted to mesh with a worm 328 keyed to the cross shaft 6 through which the power for driving the machine is derived by means of the beveled gears 8 and 9 of the driving shaft 10, hereinbefore mentioned. The feeding screw 318 and spacing screw 319 are journaled in suitable supports 329 secured to the bed of the machine, as shown in Fig. 8. The needles are placed upon these respective screws, the shank of the needle resting upon the feeding screw 318 and the blade of the needle resting upon the screw 319, as shown in Fig. 9. A guiding plate 330 is adjustably secured by screws 331 to a connecting bar 332 extending between the supports 329, and serves to guide the shank end of the needle longitudinally of the feeding device. This slide may be laterally adjusted for different length needles. When the needles are positioned by hand upon the feeding screw they may be in various positions, that is to say, the round or flat side of the shank may be up, down, or in various intermediate positions. In order to position the needles with their flat side of the shank up, a positioning wiping device 333 is positioned over the shank end of the needle and in contact therewith, and more especially the round portion of the shank for revolving the needle until it finds its position with the flat side of the shank up between the threads of the feeding screw, whereupon it will remain so until delivered to the loading head. The wiping device 333 consists of an oscillating member 334 provided on the end of the shaft 335 extending through the bearing 336 adjustably mounted on a support 337. The wiping member 334 is made of a suitable material for frictionally engaging the shank end of the needle and positioning the same with the flat side of the shank up. Coöperating with the wiping member 334 are spaced yielding fingers 338 designed to contact with the needle. These fingers are secured on screws 339 to a bracket 340 extending from the wiping device. A spring finger 341 projects from one of the yielding fingers 338 and further serves to guide the needles in conjunction with a spring pressed plate 342 designed to keep the needles in the position with the flat side of the shank up until they are delivered to the loading device. The spring pressed plate 342 is yieldingly positioned above the shank of the needle by the spring fingers 343 secured by screws 344 upon a bracket 345 extending from one of the supports 329. The spacing screw 319 is relatively pitched with relation to the feeding screw 318 for spacing and accelerating the delivery of the needles to the loading head, as indicated by the numeral 346. The delivering of the needles successively to the loading head is maintained in timed relation to the movement of said loaded head in gripping the needle between the jaws 90 and 91 of said loading head, turning and inserting it into the needle support, and returning for the next needle to be delivered. The mechanism for controlling the movement of the wiping device, and more especially the wiping member 334, comprises a disk 347 to which a depending rod 348 is adjustably connected; and a pivoted lever 349, one end of which is connected at 350 to the depending rod 348. The lever 349 is pivoted at 351 to a depending bracket 352 extending from beneath the bed of the machine. Coöperating with the lever 349 is a projecting stud 353 extending into a cam groove 354 formed in the side wall of the drum upon which the cam groove 119 is provided. The movement of the projecting stud within the cam groove 354 transmits to the wiper 334, through the rod connection 348, an oscillating movement for wiping the shanks of the needles and positioning them on the finished groove with the flat side of the shank up. A spring 355 is secured to the lever 349, and the under side of the bed, and serves to return the lever 349 against a depending stop 356 when the cam groove 354 acts to move the lever 349 in a downward direction. By this construction it will be seen that as the needles are gradually fed to the loading head they are properly positioned by the wiping device operated through the mechanism just described in relatively timed relation to the feeding mechanism.

*Needle pan and distributing mechanism.*

Referring to Figs. 1 and 2, and 25 to 27, inclusive, the mechanism for receiving the straightened needles from the chute 317 and distributing the needles equally within a needle receiving pan, comprises among other things, a sliding carriage 357 reciprocably movable upon opposite guides 358 and 359 arranged on a shelf 360 interposed between the legs 2 of the machine; and means for operating said carriage, said means being driven by means of the belt 361 arranged to pass over a hub pulley 362 formed on the driving shaft 10 of the machine, and a pulley 363 formed on one end of a shaft 364 through which motion is transmitted to the carriage 357 for reciprocating the same. The shaft 364 is suitably mounted in bearing supports 365 and is provided with a worm 366 adapted to mesh with a worm gear 367 secured to a cross shaft 368 journaled in bearings 369. To the inner end of the cross shaft 368 is secured a disk 370 to the periphery of which is attached a striking finger 371. The striking finger 371 is designed to coöperate with substantially oppositely arranged blocks 372 and 373 provided on a movable bar 374 supported on pivoted links 375 on a base plate 376 arranged on the shelf 360.

Referring to Fig. 25 it will be seen that as the disk 370 carrying the striking finger 371 is rotated in the direction of the arrow shown in said figure, the said striking finger 371 will contact successively with the substantially oppositely positioned blocks 372 and 373, thereby causing the bar 374 to move in a reciprocatory path in the direction of the arrows shown in full and dotted lines on said bar. The bar 374 has adjustably secured thereto by means of the depending brackets 377 a rod 378 having an engaging nose or head 379 designed to coöperate with oppositely spaced toothed sections 380 and 381 formed on the projecting head 382 provided on the carriage 357. The engaging nose 379 of the rod 378 is designed to push the reciprocating carriage 357 when the said nose 379 is riding in the toothed section or track 381, as shown in sectional view in Fig. 27, in the direction of the arrow shown therein. As the nose 357 is moved in the direction of the arrow shown on the carriage in Fig. 25 the nose 379 of the actuating rod 378 ultimately reaches the opened portion 383, whereupon a pushing movement still being given to said rod the beveled surface 384 in said opened portion 383 will deflect the nose 379 across the open space and into the toothed section 380. As the nose 379 rides over the same surface of the first tooth and drops behind the shoulder thereof the pulling action of the nose 379 will be produced and the carriage moved in a step by step motion in the direction of the arrow shown in dotted lines in Fig. 26, until the open space 385 is reached, whereupon the beveled side 386 of said open space will cause the nose 379 to be deflected across and into the toothed section 381 for again repeating the pushing operation of the carriage and reciprocating it in the direction of the arrow shown in full lines in Fig. 26. As the carriage is moved in a step by step action the needles are successively distributed between the partitions 387 of the needle pan or tray 388 carried by the reciprocating carriage 357. The needles are fed to the receiving pan through the chute 317, shank downwardly, as shown in Fig. 25.

*Electrical connections for straightening stations.*

Referring to Fig. 31 of the drawings a diagrammatic illustration is shown of the electrical connections and circuits for the respective top side crook station, bottom side crook station, unnatural crook station, natural crook station near the shank of the needle, and the natural crook station near the point of the blade of the needle.

The electrical circuit comprises a battery 389, one pole of which is grounded as at 390 upon the machine, and as shown in said figure is diagrammatically taken to some stationary portion of the needle support. The other pole has connected thereto in series each of the aforesaid straightening devices or opening stations. As hereinbefore described the current passes through the machine through the ground 390 and the coils 165 and 217 of the straightening stations. Conductors 391 connect the coils to the main conductor leading from the pole in the battery. In operation it will be seen that as long as the needle which is being operated upon at each respective station remains in contact with the anvil upon which it is being straightened an electrical circuit is completed and the effective striking blow of the hammers will be delivered in gradual increasing intensity until the crook has been removed from the needle at which time the operating station is cut out from the circuit and the effective hammering upon the needle is stopped. Various other ways of electrically connecting the stations to accomplish the same result may be resorted to, and I do not limit myself to the exact diagram illustrated in Fig. 31 of the drawings.

*Operation of machine.*

In operation the needles are spread by hand upon a feeding screw 318 with their blades bearing upon a smooth surface of the screw 319. The wiping mechanism is then brought into operation and positions the needles with the flat side of the shank up. The needles are continuously fed to the loading head and there gripped between the jaws 90 and 91 thereof to be delivered to one of the chucks in the needle support. The loading head is now operated by the cam groove 119 operating upon the roller 120 for swinging the gripping jaws at right angles to their initial position against the stop screw 127 (see Fig. 8), after which the continued movement of the roller 120 in the groove 119 operates to move the slide 99 of the loading head inwardly toward the needle support. As the head 88 of the loading device is revolved the beveled gear 92 revolves around the stationary beveled gear 93 and changes the relative position of the needle in the gripping jaws so that it will be delivered to the needle support with the flat side of the shank perpendicular. When seating the shank of the needle into one of the chucks 19 the jaw 27 of said chuck is swung away from its coöperating fixed jaw 28 in the manner hereinbefore described. After seating the needle in the chuck the gripping jaws 90 and 91 of the loading head are opened from the actuation of the rod 112 moved by the lever 113, subsequent to which the loading head can be retracted and returned to its normal position for the gripping of another needle to be straightened. Upon the retracting of the locking lever 70 from one of the recesses 74 in the needle support the latter will be rotated one-eighth of a turn until the needle is brought to the first straightening station at which time the locking lever 70 engages a succeeding recess 74 and holds the needle support against rotation through the friction drive hereinbefore described. At the first station the top side crook of the needle is hammered out by the hammer 134 operating upon the bottom of the blade of the needle against the anvil 182. As soon as the crook is removed the effective operation of the hammer 134 against the blade of the needle is automatically stopped, although the vibrations of the hammer continue, due to the continuously revolved shaft 170 and the cam controlled vibrating slide 175 hereinbefore described. Should for any reason the needle not possess the crook to be treated at this station the point of the needle will not contact with the anvil 182 thereby preventing the closing of the electrical circuit through the needle as has been described, and consequently allowing the hammer 134 to continue to vibrate, but not effectively, against the blade of the needle.

From the straightening station the needle is then conveyed, by reason of the releasing of the locking lever and needle support, to the next station where the said needle support is again held against rotation. At this station the bottom side crook of the needle is removed. The hammer 185 is designed to operate upon the top of the needle at this station and remove the bottom side crook of the needle. If this crook be present in the needle the point thereof will bear against the anvil 229, closing the electrical circuit through a needle, and cause a gradually increasing blow to be delivered to the needle until the crook is removed. Should the needle not possess this crook the effective operation of the hammer 185 will be prevented by reason of the failure of the needle to close the circuit and thereby fail to bring the said vibrating hammer low enough to strike the blade of the needle. Upon leaving this station the needle is brought by the rotating support to the turning station at which station the needle support is held against rotation while the turning head moves inwardly and the gripping jaws 239 open, grip and withdraw the needle and give it a quarter of a turn, and then replace the needle with the flat side of the shank up within the chuck 19 of the needle support, which is opened when the jaws 239 of the turning head move inwardly to grip the needle. The locking lever 70 is again retracted and the needle support is allowed to rotate another one-eighth of a turn.

When the needle is brought to the next station the unnatural crook contained in the needle is hammered out by a straightening station similar in construction and operation to the first station at which the needle was treated. Should this crook not be found in the needle the operation at this station will be rendered ineffective against the needle because of its failure to close the electrical circuit and thereby bring the vibrating hammer of this station into striking contact with the blade of the needle. If this crook is found the circuit will be closed and an effective blow of gradually increasing intensity delivered to the blade of the needle for removing the crook.

From this station the needle is then conveyed to the next, at which point the dial is again locked and the straightening operation for removing the natural crook near the shank of the needle performed. This mechanism is identical in operation with the mechanism for treating the blade of the needle at the second station, and will be rendered effective if this crook in the needle is found by reason of the closing of the electrical circuit and the bringing of the hammer of this station into striking contact with the needle. If this crook is not found the station will be rendered ineffective against any operation upon the needle. The hammer at this station is positioned to operate substantially half way down the blade from the shank for striking and removing the natural crook near the shank of the needle.

Figure 7:
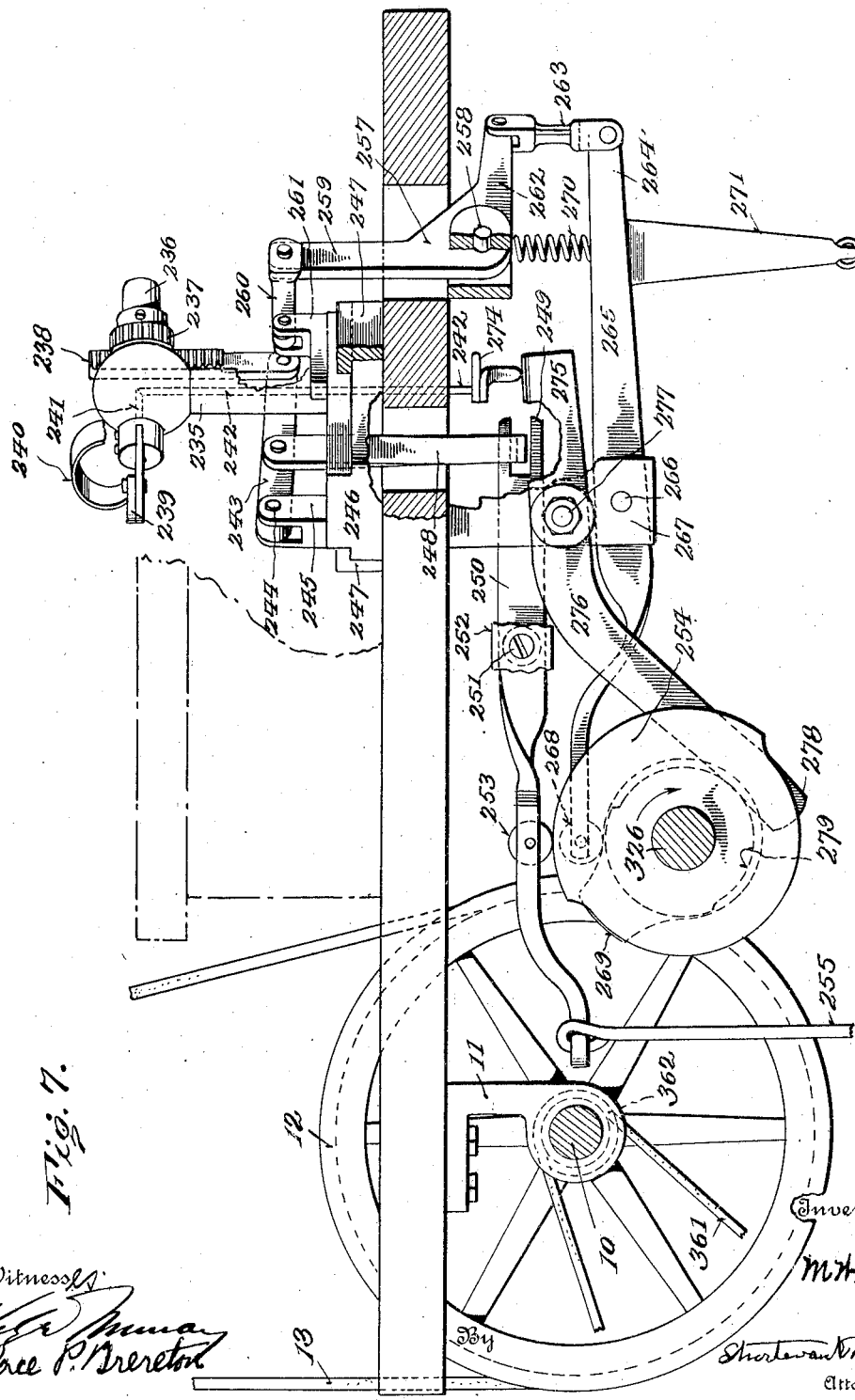
Fig. 7 is a transverse sectional view on the line 7—7 of Fig. 3 illustrating the several cams and controlling mechanisms for gripping, withdrawing, turning and reinserting the needle into the chuck during the straightening operation.

After having been straightened at this station the needle is then moved by the needle support to the final straightening station at which point the natural crook near the point of the needle is removed. The hammer at this station and the mechanism for operating the same is of the same construction and operation as at the preceding station except that the effective blow of said hammer is delivered nearer the point of the needle. This assures the complete removal of the natural crook in the needle. If for any reason this portion of the crook does not present itself the operation of the straightening device upon the needle will not occur because of the failure of the needle to close the electrical circuit therethrough, and bring the hammer into striking contact with the blade of the needle. From the final straightening station the needle is then conveyed to the ejecting mechanism which grips the needle, and removes it from the chuck which is opened at this station, and delivers it to the hopper 316 from which it is transmitted through the chute 317 to the needle receiving pan. It will be seen that during the operation of the machine all five of the needle straightening stations are operated, that is to say, the vibrating action of each hammer in each station is maintained continuously, but not necessarily effectively, against the blade of the needle unless the crook to be removed be found, when of course the electrical circuit in that particular station is closed and the hammer is gradually brought into increasing vibratory contact with the blade of the needle for removing the crook therefrom. Several mechanisms of the associated coöperating devices for controlling the operations thereof are all timed to periodically operate during the treating of the needle at the respective stations hereinbefore described. Assuming that the loading head has just returned for another needle to be delivered to the needle support, and the five straightening stations are being operated, the jaws of the turning head open, move inwardly and grip the needle, and then turn by the pinion 237 a quarter of a turn through the elevating of the rack 238 (see Fig. 7), changing the shank of the needle from its position with the flat side perpendicular to the position with its flat side horizontal. The next movement of the machine is the retracting of the locking lever 70, and the needle support then begins to move its one-eighth turn, until the locking lever engages the succeeding recess 74 at which time the needle support is again held against rotation. In timed relation the ejecting mechanism now moves in to get a needle, the gripping jaws thereof being spread. The loading head jaws which have gripped a needle to be straightened are now swung at right angles and moved from the vertical position to the horizontal position for placing the needle in the needle support with the flat side of the shank perpendicular. The timing of the machine now provides for the outward movement of the ejecting mechanism, the straightened needle having been gripped between the jaws 280 thereof. As the ejecting mechanism moves out the jaws 280 are opened as has been heretofore described, and the needle delivered to the chute and needle receiving pan. In timed relation the loading head now moves in by virtue of the slide 99 to which it is connected being operated through the cam groove 119 and roller 120. This movement permits the loading head to seat the shank of the needle within one of the chucks or needle retaining devices 19. In timed relation the turning head now withdraws the needle from the dial and turns the same from the position with the flat side perpendicular to the position with the flat side horizontal. The loading head is now retracted and swung backwardly and abutted against the feeding off end of the feeding screws to receive another needle to be straightened. The turning head now moves in with the flat side of the shank of the needle up and seats the same within the chuck from which it was withdrawn. The gripping jaws 239 of the turning head now open and are returned in their vertical position for operating upon the succeeding needle. At this point the locking lever 70 is again retracted and the needle support moves.

Various changes in the construction, arrangement and relative timing of the machine may be resorted to without departing from the spirit of my invention, and I do not limit myself to the exact form of associated parts and mechanical details herein set forth.

What I claim is:

1. In a needle straightening machine the combination with a needle support, of a plurality of needle straightening devices each including a hammer, means for intermittently rotating said needle support, and means including an electrical circuit for automatically controlling the point at which the end of the stroke of the hammer terminates, thereby regulating the effective operation of the needle straightening device.

2. In a needle straightening machine the combination with a needle support, of a plurality of needle straightening devices each including a hammer, means for intermittently rotating said needle support, and means including an electric circuit closed by the needle being straightened for controlling the point at which the stroke of the hammer terminates, thereby regulating the effective operation of the needle straightening device.

3. In a needle straightening machine, the combination with a needle support; of a needle straightening device including a pivoted hammer, and means including an electric current for shifting the pivotal point of the hammer and thereby controlling the position at which the stroke of the hammer terminates.

4. In a needle straightening machine, the combination with a needle support; of a needle straightening device including a pivoted hammer, and means including an electric current arranged to pass through the needle being straightened for shifting the pivotal point of the hammer and thereby controlling the position at which the stroke of said hammer terminates.

5. In a needle straightening machine the combination with a needle support, of a needle straightening device including a hammer and means including an electric current for varying the fulcrum point of the hammer and thereby varying the intensity of the action of the straightening device upon the blade of the needle being straightened.

6. In a needle straightening machine the combination with a needle support of a needle straightening device including a pivoted hammer, means including an electric current for shifting the pivoted point of the hammer, thereby controlling the effective operation of said straightening device until the crook in the needle is removed.

7. In a needle straightening machine the combination with an intermittently rotated needle support having a plurality of needle retaining chucks each being provided with a pin, means including a movable slide for striking said pin and opening the chucks, and means including a spring for closing said chucks when the needle support is intermittently rotated.

8. In a needle straightening machine the combination with a needle suport having a series of needle retaining chucks therein, means for feeding a plurality of needles successively to said chucks, means for opening one of the chucks during the straightening operation, means for withdrawing the needle therefrom, turning the same, and reinserting said needle in the chuck from which it was withdrawn, and means for opening said chuck in order that the needle may be ejected after the straightening operation.

9. In a needle straightening machine the combination with a needle support of a needle feeding mechanism including a loading head, means for moving said loading head toward and away from the needle support, and means for revolving said loading head.

10. In a needle straightening machine for the combination with a needle support of a needle feeding mechanism including a loading head, a needle gripping device carried by said loading head, means for turning said gripping device, means for opening and closing said gripping device, and means for moving the loading head toward and away from the said needle support.

11. In a needle straightening machine the combination with a needle support of a needle feeding mechanism including a loading head, a gripping device carried by said head, means for opening and closing said gripping device, and means for turning the same.

12. In a needle straightening machine the combination with a needle support of a needle feeding mechanism including a loading head, a needle gripping device carried by said head, means including a rack and pinion for turning the gripping device, means including beveled gears for revolving the gripping device, and means for moving said loading head toward and away from the needle support.

13. In a needle straightening machine the combination with a needle support of a needle feeding mechanism including a loading head, a needle gripping device carried by said head, means for turning the gripping device, means for revolving the gripping device, and means for moving the loading head toward and away from the needle support.

14. In a needle straightening machine the combination with a needle support designed to position a needle with its top side crook up, of a pivoted straightening hammer arranged to deliver a blow upon the under side of said needle, and means for operating the straightening hammer and means for shifting the pivot point of the hammer to vary the blows.

15. In a needle straightening machine the combination with a needle support and a straightening device designed to remove the top side crook in a flat shank needle, said device including a vibrated hammer arranged to deliver blows upon the under side of said needle, means including an electric current for shifting the pivot point of the hammer to regulate the effective striking of said vibrated hammer against the blade of the needle, thereby gradually regulating the intensity of said blows until the crook is removed.

16. In a needle straightening machine the combination with a needle support and a straightening device designed to remove a crook in a flat shank needle, said device comprising a striking hammer, means for continuously vibrating said hammer, and means for shifting the pivot point thereof to bring the vibrated hammer into and out of contact with the needle.

17. In a needle straightening machine the combination with a needle support and a straightening device designed to remove a crook in a flat shank needle, said device comprising a striking hammer, means including a cam for continuously vibrating said hammer, and means including an electrically controlled eccentric for bringing the vibrated hammer into and out of contact with the needle.

18. In a needle straightening machine the combination with a needle support and a straightening device designed to remove a crook in a flat shank needle, said device comprising a striking hammer, means including a reciprocated slide for vibrating said hammer, and means including a worm and wormgear designed to be brought into and out of mesh for bringing the vibrated hammer into and out of contact with the needle.

19. In a needle straightening machine the combination with a needle support of a straightening device designed to remove a crook in a flat shank needle, said device comprising a pivoted striking hammer, means for continuously vibrating said hammer, and means for shifting the pivotal connection thereof for bringing the same into and out of contact with the needle.

20. In a needle straightening machine the combination with a needle support and a straightening device designed to remove a crook in a flat shank needle, said device comprising a striking hammer, means for continuously vibrating said hammer, means for bringing the hammer into and out of contact with the needle, and means including an electrically controlled eccentric for gradually increasing the intensity of the blow of the hammer against the blade of the needle.

21. In a needle straightening machine the combination with a needle support and a straightening device designed to remove a crook in a flat shank needle, said device comprising a striking hammer, means for continuously vibrating said hammer, means for positioning the hammer into and out of contact with the needle, means including an eccentric for gradually increasing the intensity of the blows of the hammer against the blade of the needle, and means including an electric current for bringing and keeping the vibrated hammer in contact with the needle blade until the crook in the needle is removed.

22. In a needle straightening machine the combination with a needle straightening device, of a continuously vibrated hammer, a pivot for said hammer, means including a movable block for shifting the pivotal connection of the hammer, an eccentric connected to said movable block, and means for revolving said eccentric when the hammer is brought into contact with the needle.

23. In a needle straightening machine the combination with a needle streightening device of a coöperating anvil, a vibrating hammer, and means including an electric current for shifting the pivot point of and thereby bringing the vibrated hammer into striking contact with the needle when the blade of said needle contacts with the anvil.

24. In a needle straightening machine the combination with a needle support and a straightening device designed to remove the bottom side crook in a flat shank needle, said device including a vibrated hammer arranged to deliver blows upon the top side of said needle, means including an electric current for shifting the pivot point of and thereby regulating the effective striking of said vibrated hammer against the needle, and means for regulating the gradual intensity of said blows until the crook is removed.

25. In a needle straightening machine the combination with a needle straightening device of a continuously vibrated hammer, a pivot for said hammer, means including a movable block for shifting the pivotal connection of the hammer, a pin connected to said movable block, an eccentric for controlling the movement of said pin, and means for revolving said eccentric when the hammer is brought into contact with the needle.

26. In a needle straightening machine the combination with a needle support and a turning mechanism for positioning the needle at right angles in said support, said turning mechanism comprising a needle gripping device, means for moving said gripping device toward and away from the needle support, and means for turning said device.

27. In a needle straightening machine the combination with a needle support and a turning mechanism for positioning the needle at right angles in said support, said turning mechanism comprising spring actuated needle gripping jaws, means for opening said jaws, means for revolving said jaws a quarter turn, and means for moving said gripping jaws toward and away from the needle support.

28. In a needle straightening machine the combination with a needle support and a needle turning mechanism for removing the needle from said support and giving it a partial turn, means including a cam for moving the needle turning mechanism toward and away from the needle support.

29. In a needle straightening machine the combination with a needle support and a needle turning mechanism for withdrawing the needle therefrom, giving it a quarter turn and reinserting the same in said needle support, and means including a plurality of interconnected levers for operating the said turning mechanism.

30. In a needle straightening machine the combination with a needle support and a needle ejecting mechanism comprising a gripping device formed of spring actuated gripping jaws, means for moving the said gripping device toward and away from the needle support, means for spreading the spring actuated gripping jaws, said means including a slide relatively movable with relation to the gripping jaws, and provided with a reduced end movable therebetween.

31. A needle straightening machine including in combination, an intermittently rotated support, means for successively loading said support with needles to be straightened, a plurality of electrically controlled straightening devices radially located above said support, means for maintaining the operation of any one or more of the straightening devices until the crooks in each needle are removed, means for positively turning the needles in the course of the straightening operations, ejecting mechanism for delivering the straightened needles to a needle-receiving pan, and means for automatically distributing the straightened needles in said receiving pan.

32. An organized machine for straightening flat shank needles comprising an intermittently rotated needle support having a plurality of holding chucks for said needles, means for positioning the needle with the flat side of the shank perpendicular, means for hammering on the bottom side thereof to remove the top side crook and means for hammering on the top side thereof to remove the bottom side crook, means for turning the needle with the flat side of the shank from a perpendicular position to a position with the flat side of the shank horizontal, means for hammering on the bottom side of the needle to remove the unnatural crook, means for hammering on the top side of the needle near the shank thereof to remove the natural crook midway between the blade and the shank of the needle, and means for hammering on the top side of the needle to remove the natural crook midway between the blade and the point of the needle.

33. In an organized machine for straightening flat shank needles, a series of holding devices for the needles, a series of anvils upon which the needles rest, an electric circuit including as a part of it the needle and anvil, a series of pivoted levers carrying hammers coacting with the anvils, mechanical means for vibrating said levers to give the hammer blows, means for shifting the fulcrum point of said levers to vary the blows given thereby, said shifting means being controlled by the electric contact between the needle and the anvil.

In testimony whereof I affix my signature, in the presence of two witnesses.

M. WARNER MAINE.

Witnesses:
 OLIVE B. VINCENT,
 ETHEL L. MULLER.